(12) United States Patent
    Kim et al.

(10) Patent No.: US 11,334,745 B2
(45) Date of Patent: May 17, 2022

(54) ELECTRONIC DEVICE AND METHOD FOR PROVIDING SERVICE INFORMATION RELATED TO BROADCAST CONTENT IN ELECTRONIC DEVICE

(71) Applicant: Samsung Electronics Co., Ltd., Gyeonggi-do (KR)

(72) Inventors: Jongho Kim, Gyeonggi-do (KR); Jungkun Lee, Gyeonggi-do (KR); Gippeum Choi, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 16/955,261

(22) PCT Filed: Nov. 22, 2018

(86) PCT No.: PCT/KR2018/014460
    § 371 (c)(1),
    (2) Date: Jun. 18, 2020

(87) PCT Pub. No.: WO2019/124775
    PCT Pub. Date: Jun. 27, 2019

(65) Prior Publication Data
    US 2020/0394389 A1    Dec. 17, 2020

(30) Foreign Application Priority Data
    Dec. 22, 2017  (KR) .................. 10-2017-0178567

(51) Int. Cl.
    *G06K 9/00*         (2006.01)
    *G06F 16/783*       (2019.01)
(52) U.S. Cl.
    CPC ....... *G06K 9/00241* (2013.01); *G06F 16/783* (2019.01); *G06K 9/00281* (2013.01); *G06K 2009/00328* (2013.01)

(58) Field of Classification Search
    CPC ........... H04N 21/4828; H04N 21/4312; H04N 21/84; H04N 21/47214; H04N 21/4334;
    (Continued)

(56) References Cited

U.S. PATENT DOCUMENTS

| 6,061,056 A | * | 5/2000 | Menard ............... H04N 5/4401 715/704 |
| 8,351,761 B2 | * | 1/2013 | Harris ................. H04N 5/76 386/249 |

(Continued)

FOREIGN PATENT DOCUMENTS

| KR | 10-2013-0032653 A | 4/2013 |
| KR | 10-2013-0081595 A | 7/2013 |

(Continued)

*Primary Examiner* — Wesley J Tucker
(74) *Attorney, Agent, or Firm* — Cha & Reiter, LLC

(57) ABSTRACT

An electronic device according to one embodiment of the present invention comprises: at least one communication interface; a display; a memory; and at least one processor electrically connected to the at least one communication interface, the display, and the memory, wherein the memory may store instructions which, when executed, cause the at least one processor to: acquire, in response to receiving a request for service information related to broadcast content sent from a content server, at least one image frame included in the broadcast content; determine whether at least one face region has been detected within the at least one image frame; perform, if the at least one face region is determined to have been detected, image analysis on the basis of the detected at least one face region; and provide, through the display, service information corresponding to a result of the image analysis. In addition, various embodiments are possible.

12 Claims, 22 Drawing Sheets

(58) Field of Classification Search
CPC ............... H04N 21/426; H04N 21/432; H04N 21/47202; H04N 21/475; H04N 21/4722; G06K 9/00241; G06K 9/00281; G06K 2009/00328; G06K 2209/27; G06K 9/00228; G06F 16/783; G06T 7/11; G06T 2207/30201

See application file for complete search history.

(56) References Cited

U.S. PATENT DOCUMENTS

| | | | |
|---|---|---|---|
| 2010/0149305 A1* | 6/2010 | Catchpole | G06K 9/00288 348/14.08 |
| 2011/0111514 A1 | 5/2011 | Laurent et al. | |
| 2011/0129121 A1* | 6/2011 | Corcoran | G06K 9/00281 382/103 |
| 2013/0179436 A1 | 7/2013 | Yun et al. | |
| 2014/0237495 A1* | 8/2014 | Jang | H04N 21/4126 725/12 |
| 2014/0282674 A1* | 9/2014 | Conradt | H04N 21/84 725/19 |
| 2015/0326930 A1* | 11/2015 | Jang | H04N 21/8133 725/32 |
| 2016/0191591 A1* | 6/2016 | Rider | H04N 21/278 709/219 |
| 2017/0026706 A1 | 1/2017 | Choi | |
| 2017/0109419 A1* | 4/2017 | Farre Guiu | G06F 16/2365 |
| 2017/0251261 A1* | 8/2017 | James | H04N 21/4725 |
| 2018/0020259 A1 | 1/2018 | Kim et al. | |
| 2019/0205645 A1* | 7/2019 | Bates | G06T 11/60 |
| 2021/0073277 A1* | 3/2021 | An | G06F 16/434 |

FOREIGN PATENT DOCUMENTS

| | | |
|---|---|---|
| KR | 10-2015-0066915 A | 6/2015 |
| KR | 10-2015-0078287 A | 7/2015 |
| KR | 10-2017-0011072 A | 2/2017 |
| WO | 2016/126048 A1 | 8/2016 |

* cited by examiner

ELECTRONIC DEVICE AND METHOD FOR PROVIDING SERVICE INFORMATION RELATED TO BROADCAST CONTENT IN ELECTRONIC DEVICE

CROSS-REFERENCE TO RELATED APPLICATION(S)

This application is a National Phase Entry of PCT international Application No. PCT/KR2018/014460, which was filed on Nov. 22, 2018, and claims priority to Korean Patent Application No. 10-2017-0178567 filed on Dec. 22, 2017 in the Korean Intellectual Property Office, the contents of which are incorporated herein by reference.

BACKGROUND

1. Field

Various embodiments of the present invention relate to an electronic device and a method of providing service information corresponding to a request for information related to broadcast content while viewing the broadcast content.

2. Description of the Related Art

With the recent growth of wireless communication technology, various things are given communication functionality, and they may be networked and easily controlled. As such, networking communication functionality-equipped things is called the Internet of things (IoT).

The IoT refers to an intelligent technology and service for communication between a human and a thing or between things based on communication, such as the Internet. With the IoT, a user may control an external device (e.g., a smart TV), which can communicate with an electronic device (e.g., a smartphone), on the electronic device. For example, while viewing broadcast content output through the external device, the user may control the external device via the electronic device to receive service information related to the broadcast content.

SUMMARY

The user may perform image analysis on all image frames included in the broadcast content to receive the broadcast content-related service information or may receive the broadcast content-related service information based on the broadcast content-related meta information. Due to the need for image analysis on each image frame, such a method may fail to do so or may provide only service information limited to meta information due to limited resources. Another method is to perform image analysis on limited frames by the user's manual trigger. However, this method requires the user's involvement, such as reentry by the user and, thus, the usability may be deteriorated.

According to various embodiments of the present invention, there may be provided an electronic device capable of receiving broadcast content-related service information based on whether there is a facial area in at least one image frame included in the broadcast content and a method of providing the broadcast content-related service information by the electronic device.

According to various embodiments of the present invention, there may be provided an electronic device capable of automatically providing broadcast content-related service information based on a variation in the number of facial areas in at least one image frame included in the broadcast content and a method of providing the broadcast content-related service information by the electronic device.

According to various embodiments of the present invention, there may be provided an electronic device capable of providing broadcast content-related service information based on a result of image analysis on the center of a facial area in at least one image frame included in the broadcast content and a method of providing the broadcast content-related service information by the electronic device.

According to various embodiments, an electronic device comprises at least one communication interface, a display, a memory, and at least one processor electrically connected with the at least one communication interface, the display, and the memory, wherein the memory stores instructions that cause, when executed, the at least one processor to obtain at least one image frame included in broadcast content transmitted from a content server, in response to reception of a request for service information related to the broadcast content, determine whether at least one facial area is detected from the at least one image frame, upon determining that the at least one facial area is detected, perform image analysis based on the detected at least one facial area, and provide service information corresponding to a result of the image analysis via the display.

According to various embodiments, there is provided a computer-readable recording medium recording a program running on a computer, the program comprising executable instructions that cause, when executed by a processor, the processor to obtain, by an electronic device, at least one image frame included in broadcast content transmitted from a content server, in response to reception of a request for service information related to the broadcast content, determine whether at least one facial area is detected from the at least one image frame, upon determining that the at least one facial area is detected, perform image analysis based on the detected at least one facial area, and provide service information corresponding to a result of the image analysis via a display of the electronic device.

According to various embodiments, an electronic device comprises at least one communication interface, a memory, and at least one processor electrically connected with the at least one communication interface and the memory, wherein the memory may store instructions that cause, when executed, the at least one processor to receive object information and a request for service information related to broadcast content from an external electronic device via the at least one communication interface, search at least one database in the memory for service information corresponding to object information based on the request, determine whether it matches the object information based on the discovered service information, and transmit service information corresponding to the object information to the external electronic device in response to matching the discovered service information.

According to various embodiments, it is possible to receive broadcast content-related service information only with image analysis on the minimum image frames based on whether the image frames include a facial area without the need for analysis on all of the image frames included in the broadcast content. Thus, resources needed to receive the broadcast content-related service information may be significantly reduced.

According to various embodiments, it is possible to automatically provide broadcast content-related service information without the user's involvement based on a variation in the number of facial areas in image frames included in the broadcast content. Thus, service information may be provided without disturbing the experience of watching TV, and user convenience may be enhanced.

According to various embodiments, it is possible to provide broadcast content-related service information based on the result of image analysis on the center of facial area in at least one image frame included in the broadcast content. It is thus possible to provide the service information for all the objects (e.g., figure images, product images, text images, or place images) in the broadcast content.

DETAILED DESCRIPTION

Figure 1:
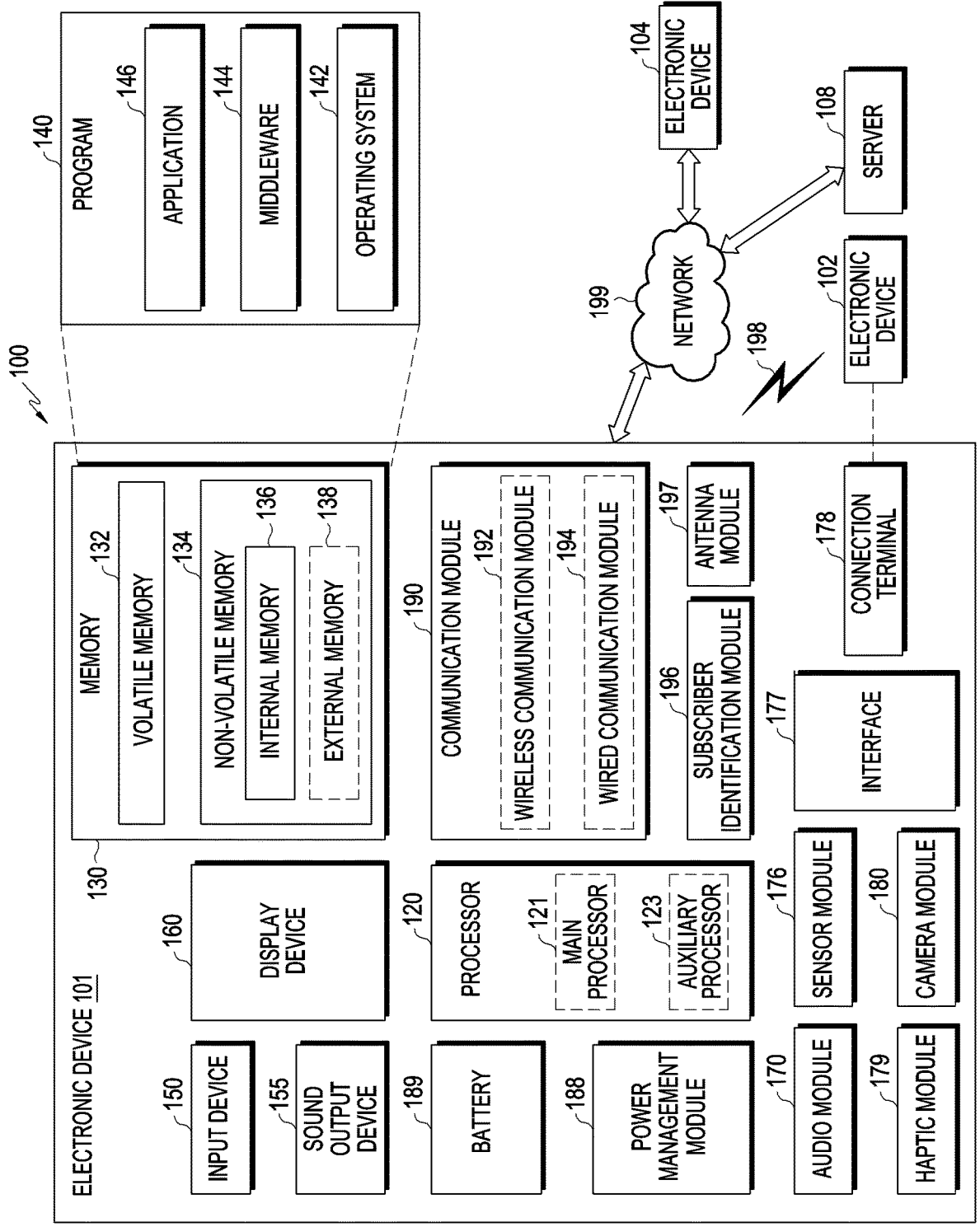
FIG. 1 is a view illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device (160) (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or sensor module 176) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 150 may include, e.g., a microphone, a mouse, or a keyboard.

The sound output device 155 may be a device for outputting sound signals to the outside of the electronic device 101. The sound output device 1155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 2660 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) wiredly or wirelessly coupled with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., a HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may include, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as Bluetooth, wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., instructions or data) therebetween.

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that the singular forms "a," "an," and "the" include plural references unless the context clearly dictates otherwise. As used herein, the term "A or B," "at least one of A and/or B," "A, B, or C," or "at least one of A, B, and/or C" may include all possible combinations of the enumerated items. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with other terms, e.g., "logic," "logic block," "part," or "circuit." A module may be a single integral part or a minimum unit or part for performing one or more functions. For example, the module may include an application-specific integrated circuit (ASIC).

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke a command stored in the storage medium and may be operated as per the invoked command. The machine may include an electronic device (e.g., the electronic device 101) according to embodiments disclosed herein. When the command is executed by a processor (e.g., the processor 120), the processor may perform a function corresponding to the command on its own or using other components under the control of the processor. The command may contain a code that is generated or executed by a compiler or an interpreter. The machine-readable storage medium may be provided in the form of a non-transitory storage medium. Here, the term "non-transitory" simply means that the storage medium does not include a signal and is tangible, but this term does not differentiate between where data is semipermanently stored in the storage medium and where data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Playstore™). When distributed online, at least part of the computer program product may be temporarily generated or at least temporarily stored in a storage medium, such as the manufacturer's server, a server of the application store, or a relay server.

According to various embodiments, each component (e.g., a module or program) may include a single or multiple entities, and the various embodiments may exclude some of the above-described sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

Figure 2A:
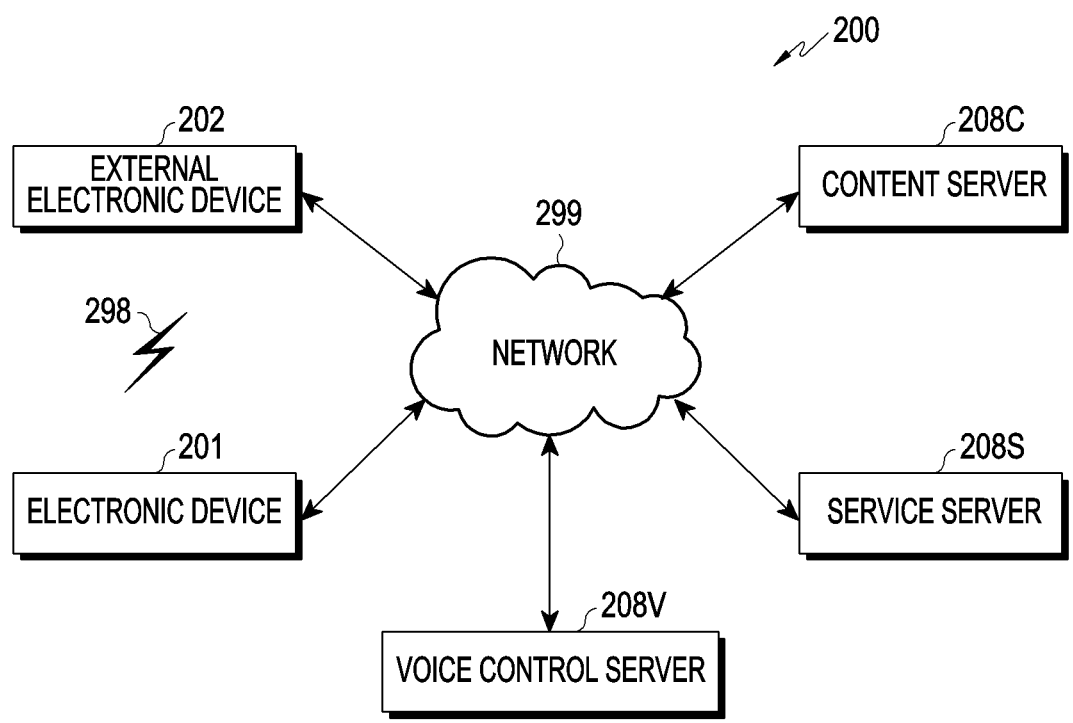
FIGS. 2A and 2B are views illustrating a system of providing broadcast content-related service information according to various embodiments.
Figure 2B:
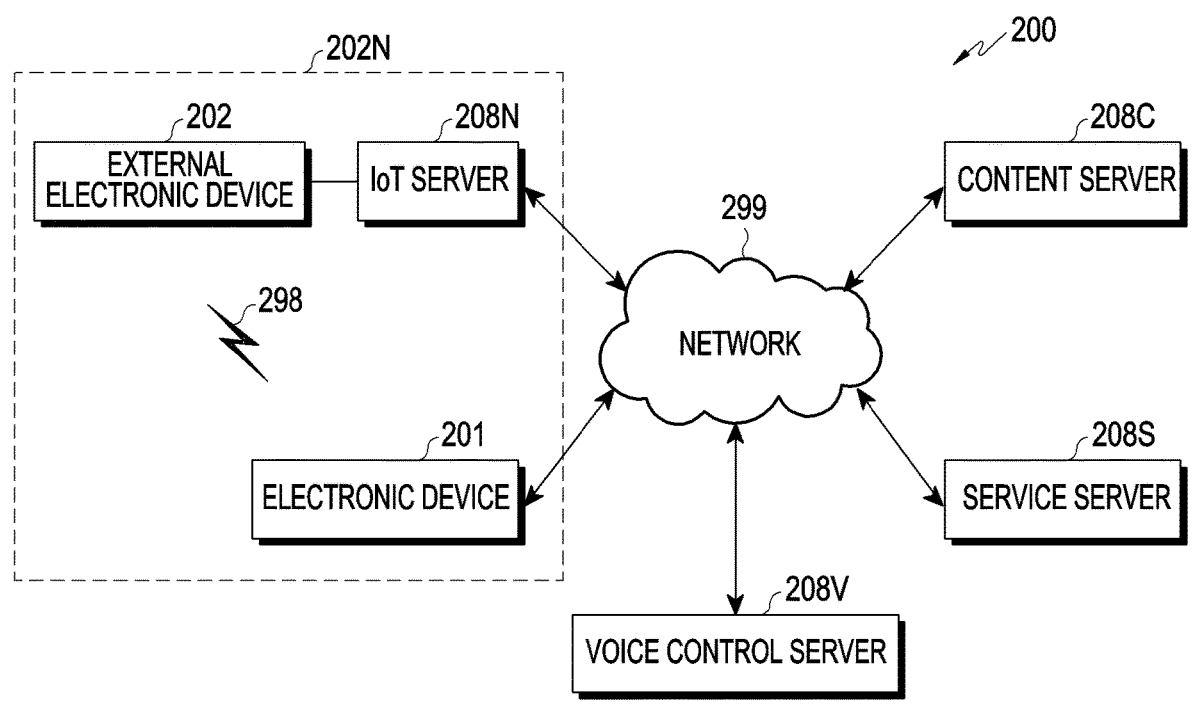

FIGS. 2A and 2B are views illustrating a system of providing broadcast content-related service information according to various embodiments. Referring to FIGS. 2A and 2B, an electronic device 201 (e.g., the electronic device 101) may communicate with an external electronic device 202 via a first network 298 (e.g., the first network 198 (e.g., short-range communication)) and communicate with a content server 208C (e.g., a broadcasting station server), a service server 208S, or a voice control server 208V via a second network (e.g., the second network 199 (e.g., remote communication)).

Referring to FIG. 2A, according to various embodiments, a system 200 providing broadcast content-related service information may include at least one of the electronic device 201, the external electronic device 202, the content server 208C, or the service server 208S. According to various embodiments, the system 200 may further include a voice recognition control server 208C for providing a voice recognition control service.

The electronic device 201 (e.g., the electronic device 101) is a device requesting and receiving service information related to broadcast content transmitted from the content server 208C (e.g., a broadcasting station server), and the electronic device 201 may be one of user terminals, such as mobile phones, smartphones, personal digital assistants (PDAs), laptop computers, or other user terminals with communication functionality. The electronic device 201 may receive a request for the broadcast content-related service information.

According to an embodiment, the request may be generated upon receiving a user input for receiving the broadcast content-related service information or when an event occurs.

According to an embodiment, the request may be generated when a designated condition for receiving the broadcast content-related service information is met.

The electronic device 201 may be configured to automatically receive the service upon receiving a user input (e.g., an "Auto On" touch) to automatically receive the service information.

In response to reception of the request, the electronic device 201 may obtain at least one captured image frame included in the broadcast content. For example, the electronic device 201 may receive at least one captured image frame corresponding to the broadcast content from the external electronic device 202 (e.g., the electronic device 102) or may capture the at least one image frame corresponding to the broadcast content.

According to an embodiment, when the broadcast content is output via the external electronic device 202 (e.g., the electronic device 102), the electronic device 201 may transmit the request to the external electronic device 202 and, in response to transmission of the request, may receive at least one image frame included in the broadcast content captured by the external electronic device 202 from the external electronic device 202.

According to an embodiment, when the broadcast content is output via the electronic device 201, the electronic device 201 may capture at least one image frame included in the broadcast content in response to reception of the request.

The electronic device 201 may determine whether to perform image analysis on the frame depending on whether at least one facial area is detected from the at least one image frame. When the at least one facial area is detected, the electronic device 201 may analyze the image frame from which the facial area has been detected and provide service information corresponding to the result of analysis.

The external electronic device 202 (e.g., the electronic device 102) may receive and output the broadcast content transmitted from the content server 208C (e.g., a broadcasting station server). The external electronic device 202 may be one of various home appliances with communication and display functionality, such as smart TVs.

According to an embodiment, the external electronic device 202 may be registered to be connected to the electronic device 201 via an inter-device communication connection app (e.g., Samsung Connection™) of the electronic device 201. The electronic device 201 may transmit/receive data to/from the external electronic device 202 via the communication connection app or may control the external electronic device 202 via the connection communication app.

The external electronic device 202 may receive a request for the broadcast content-related service information from the electronic device 201 while receiving and outputting the broadcast content. In response to reception of the request, the external electronic device 202 may capture at least one image frame corresponding to the broadcast content and transmit the at least one captured image frame to the electronic device 201.

According to an embodiment, the external electronic device 202 may perform image analysis on the frame depending on whether at least one facial area is detected from the at least one image frame. For example, the electronic device 201 may transmit a request for service information to the external electronic device 202 and, in response to reception of the request from the external electronic device 202, capture at least one image frame included in the broadcast content and determine whether at least one facial area is detected from the at least one image frame. When the at least one facial area is detected from the at least one image frame, the external electronic device 202 may analyze the image frame from which the facial area has been detected, send a request for service information corresponding to the result of analysis to the content server 208C or service server 208S and receive the service information, and retransmit the received service information to the electronic device 201.

The content server 208C (e.g., a broadcasting station server) may store at least one broadcast content or meta information related to each broadcast content. The content server 208C may transmit the at least one broadcast content to the outside via over-the-air or terrestrial broadcasting.

According to an embodiment, the meta information may include, e.g., the title of the broadcast content, broadcasting station, airtime, cast information (e.g., characters and their relationships, scenario, subtitles, etc.), filming site information, product placement (PPL) (e.g., clothing, accessories, foods, electronics, etc.), or text information (e.g., subtitles, news, breaking news, program guides, etc.).

The service server 208S (e.g., Samsung's Bixby Vision™), as a server providing various categories of service information, may be a service server, e.g., a portal search engine. The service server 208S may include at least one database storing various categories of service information. The service server 208S may receive a request for various pieces of service information from the electronic device 201 or external electronic device 202 and, in response to reception of the request, search for and provide the service information corresponding to the request.

According to an embodiment, the service information may include, e.g., figure information (e.g., celebrities, politicians, or entertainers), product information (e.g., fashion, home appliances, foods, household items, or vehicles), text information (e.g., news, news articles, papers, keywords, or tags), or place information (e.g., restaurants, beauty shops, travel sites, etc.).

The voice control server 208V (e.g., Samsung's Bixby™) may be an intelligent server providing a voice control service capable of controlling the device via the user's voice and may obtain the user's voice via the input device 150 (e.g., a microphone) of the electronic device 201 at a request for the broadcast content-related service information and provide a control service based on the voice (command) (e.g., "Who is that on TV?" "What's he wearing on TV?" or "Where is that city?").

Referring to FIG. 2B, according to various embodiments, the system 200 providing the broadcast content-related service information may further include an IoT server 208N. The system of FIG. 2B is the same as the system 200 of FIG. 2A except that the IoT server 208N is added and, thus, no detailed description is given of the same components.

The IoT server 208N, as a server for providing a home network service, may have IoT devices, e.g., the external electronic device 202, registered therein, and control them. The electronic device 201 may be connected for communication with the IoT server 208N via the second network 299. When the external electronic device 202 is registered, as an IoT device, in the IoT server 208N, the electronic device 201 may control the external electronic device 202 via the IoT server 208N or may transmit/receive data to/from the external electronic device 202.

According to an embodiment, the IoT server 208N may receive a request for broadcast content-related service information from the electronic device 201 or the external electronic device 202. In response to reception of the request, the IoT server 208N may transmit the request to the content server 208C or service server 208S and may receive the service information corresponding to the request from the content server 208C or service server 208S. The IoT server 208N may again transmit the received service information to the electronic device 201 or the external electronic device 202.

According to an embodiment, in response to reception of the request for the broadcast content-related service information, the IoT server 208N may perform image analysis on the frame depending on whether at least one facial area is detected from at least one image frame included in the broadcast content as does the electronic device 201 or external electronic device 202. For example, in response to reception of the request for the service information from the electronic device 201 or external electronic device 202, the IoT server 208N may receive at least one image frame included in the captured broadcast content from the electronic device 201 or external electronic device 20. The IoT server 208N may determine whether at least one facial area is detected from the at least one image frame. When the at least one facial area is detected from the at least one image frame, the IoT server 208N may analyze the image frame from which the facial area has been detected, send a request for service information corresponding to the result of analysis to the content server 208C or service server 208S and receive the service information, and retransmit the received service information to the electronic device 201 or external electronic device 202.

According to an embodiment, the IoT server 208N may be integrated with the service server 208S. Like the service server 208S, the IoT server 208N may include at least one database storing various categories of service information. For example, in response to reception of the service request, if the at least one facial area is detected from the at least one image frame, the IoT server 208N may analyze the image frame from which the facial area has been detected, search the at least one database stored in the IoT server 208N for the service information corresponding to the result of analysis, and transmit service information or similar service information matching the result of analysis to the electronic device 201 or the external electronic device 202.

Figure 3:
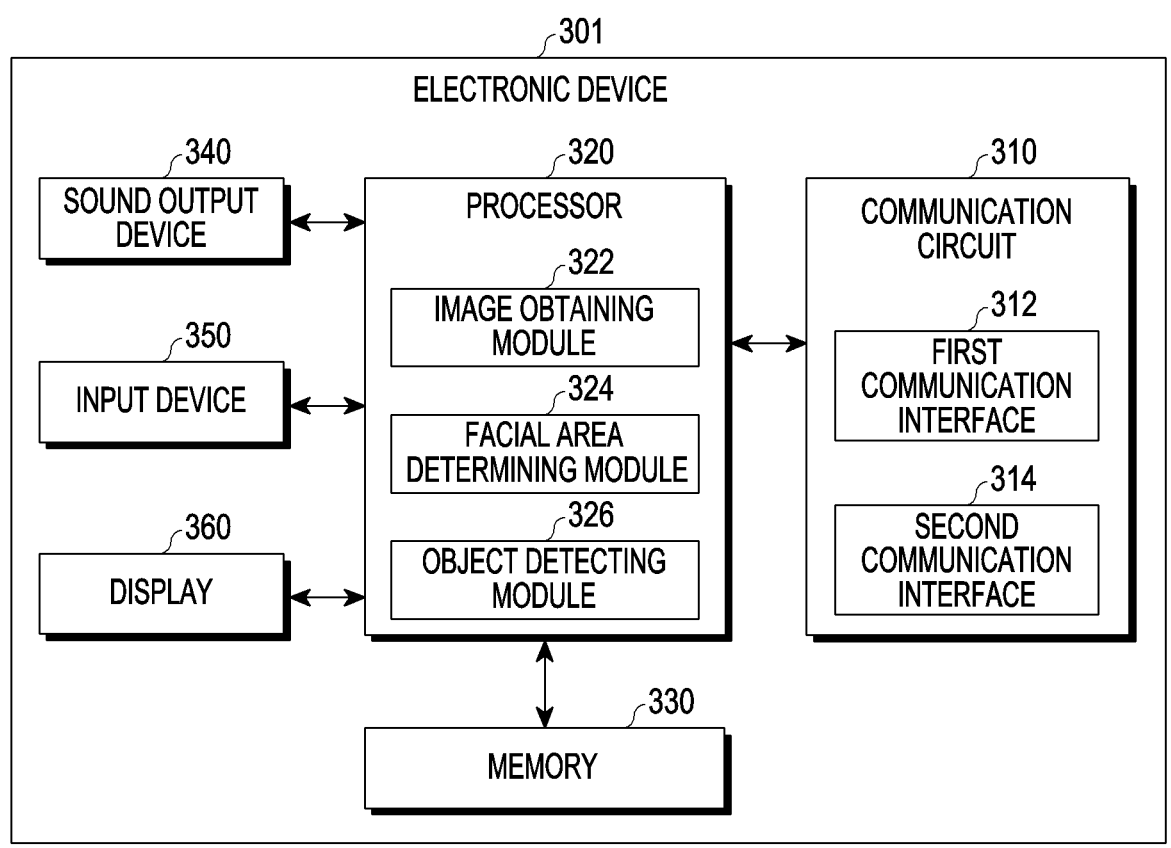
FIG. 3 is a block diagram illustrating an electronic device according to various embodiments.

FIG. 3 is a block diagram illustrating an electronic device 301 according to various embodiments.

Referring to FIG. 3, an electronic device 301 may include at least one of a communication circuit 310, a processor 320, a memory 330, a sound output device 340, an input device 350, or a display 360. FIG. 3 illustrates only components related to embodiments of the present invention, and other components than the above-listed components may also be included. For example, FIG. 3 may include the whole or part of the electronic device 101 shown in FIG. 1 or the electronic device 201 shown in FIG. 2.

The communication circuit 310 may include the whole or part of the communication module 190 of FIG. 1. For example, the communication circuit 310 may include at least one of a first communication interface 312 or a second communication interface 314. The communication circuit 310 may also be termed a communication unit or communication module, including a communication unit or communication module as part thereof, or may configure a communication unit or communication module.

According to an embodiment, the first communication interface 312 may provide data based on short-range communication. For example, the communication circuit 310 may communicate with at least one external electronic device 202 connected with a first network (e.g., the first network 298) via the first communication circuit 312. For example, the first communication interface 312 may include at least one of, e.g., a wireless fidelity (Wi-Fi), Bluetooth, near-field communication (NFC), ZigBee, Z-wave, or global navigation satellite system (GNSS).

According to an embodiment, the second communication interface 314 may provide a packet data (or Internet protocol)-based service. For example, the communication circuit 310 may communicate with at least one external electronic device (e.g., the electronic device 104 or server 106, the content server 208C, service server 208S, voice recognition control server 208V, or IoT server 208N) connected with a second network (e.g., the second network 299) via the second communication circuit 314. For example, the second communication interface 314 may include at least one of, e.g., a computer network (e.g., LAN or WAN), internet, or a telephone network.

The processor 320 may overall control the electronic device 301. According to an embodiment, the processor 320 may request service information related to broadcast content transmitted from the content server 208C and provide the service information to the user. The processor 320 may include at least one of, e.g., an image obtaining module 322, a facial area determining module 324, or an object detecting module 326. The processor 320 may include the whole or part of the processor 120 shown in FIG. 1.

The processor 320 may receive a request for service information related to broadcast content transmitted from the content server 208C.

According to an embodiment, the request may be generated upon receiving a user input for receiving the broadcast content-related service information (e.g., manual mode) or when an event occurs (e.g., auto mode).

For example, the processor 320 may receive the broadcast content-related service information in the manual mode. For example, in the manual mode, the processor 320 may receive a user input via a user interface (UI) for receiving the broadcast content-related service information. According to an embodiment, the user input may include an input signal received by the user's physical or mechanical manipulation on an input device (e.g., the input device 350 (e.g., a mouse or keyboard)) of the electronic device 301, an input signal received by the user's touch, hovering or various types of touch gestures (e.g., a double-tap, drag, drag-and-drop, swipe, or flick) on the display 360 (e.g., the display device 160 (e.g., a touchscreen)) of the electronic device 301, or an input voice (command) (e.g., "Who is that on TV?", "What's he wearing on TV?", or "Where is that city?") received by the user's utterance on an input device 350 (e.g., a microphone) of the electronic device 301.

For example, the processor 320 may receive the broadcast content-related service information in the auto mode. For example, in the auto mode, the processor 320 may cause an event for receiving the broadcast content-related service information. The processor 320 may automatically generate a request for the broadcast content-related service information when the event occurs. According to an embodiment, the event may include a variation in the number of at least one facial area detected from the at least one image frame. For example, the event may occur when the number of at least one facial area detected from the at least one image frame varies, and the electronic device 201 may automatically generate the request according to the occurrence of the event.

According to an embodiment, the request may be generated when a designated condition for receiving the broadcast content-related service information is met.

For example, the processor 320 may provide the broadcast content-related service information in the auto mode when the designated condition is met. For example, the processor 320 may previously set or designate a condition of event occurrence or a designated event occurrence frequency for receiving the broadcast content-related service information by the user. For example, the designated condition may include a designated time, the number, or respective numbers, of designated frames, detection of a designated figure, product, place, or text, a scene switch, or a combination thereof. For example, the processor 320 may determine that the designated condition is met when the designated time (e.g., the time that the broadcast content starts) arrives, when reaching the designated number of frames (e.g., every 30 frames) or designated frame number (e.g., the nth frame of every scene), when the designated figure (e.g., a particular person), product (e.g., a fashion item, accessory, or general merchandise), place (e.g., a filming scene) or text (e.g., designation of a specific keyword) is detected, or when a scene switch occurs and, as the designated condition is met, may automatically generate the request.

According to an embodiment, the processor 320 may enable the service to be automatically provided upon receiving a user input (e.g., an "Auto On" touch) to automatically receive the service information.

In response to reception of the request, the processor 320 may obtain at least one captured image frame included in the broadcast content via the image obtaining module 322. For example, the image obtaining module 322 may receive at least one image frame included in the broadcast content from the external electronic device 202 (e.g., the electronic device 202) or may capture the at least one image frame included in the broadcast content.

According to an embodiment, when the broadcast content is output via the external electronic device 202, the image obtaining module 322 may transmit the request to the external electronic device 202 and, in response to transmission of the request, may receive at least one image frame included in the broadcast content captured by the external electronic device 202 from the external electronic device 202.

According to an embodiment, when the broadcast content is output via the electronic device 301, the image obtaining module 322 may capture at least one image frame included in the broadcast content in response to reception of the request.

The processor 320 may determine whether to perform image analysis on the frame depending on whether at least one facial area is detected from the at least one image frame, via the facial area determining module 324.

According to an embodiment, the facial area determining module 324 may detect at least one candidate facial area from the at least one image frame using, e.g., face recognition technology. The facial area determining module 324 may compare the size of the at least one candidate facial area with a designated size. If the size of the at least one candidate facial area is the designated size or more, the facial area determining module 324 may detect the at least one candidate facial area as the at least one facial area. If the size of the at least one candidate facial area is less than the designated size, the facial area determining module 324 may not detect it as the facial area. In this case, the facial area determining module 324 may determine that the image frame has no facial area.

According to an embodiment, if the at least one candidate facial area is not detected from the image frame (e.g., an ith image frame, where i is a natural number) included in the broadcast content or if the size of the detected at least one candidate facial area is less than the designated size, the processor 320 may determine whether the at least one facial area is detected using a face recognition technique or algorithm on the next image frame (e.g., an i+1th image frame) included in the broadcast content.

For example, in a case where the broadcast content-related service information is provided in the auto mode, if the at least one candidate facial area is not detected from the ith image frame or if the size of the detected at least one candidate facial area is less than the designated size, the processor 320 may repeat the determination of whether the facial area is detected, through to the last image frame included in the broadcast content after the ith image frame obtained corresponding to the request or until a termination signal for providing the service information is received.

For example, in a case where the broadcast content-related service information is provided in the manual mode, if the at least one candidate facial area is not detected from the ith image frame or if the size of the detected at least one candidate facial area is less than the designated size, the electronic device may obtain at least one previous image frame (e.g., N image frames prior to the ith image frame, where N is a natural number) or at least one subsequent image frame (e.g., M image frames subsequent to the ith image frame) to the ith image frame obtained corresponding to the request and may repeat the determination of whether the facial area is detected. For example, N or M may be previously set by the processor 320 or the user.

Upon detecting the at least one facial area, the processor 320 may perform image analysis based on the detected at least one facial area, via the object detecting module 326.

According to an embodiment, the object detecting module 326 may set an object extraction area based on the detected at least one facial area in the image frame (e.g., a first image frame) from which the at least one facial area has been detected among, e.g., the at least one image frame. For example, if the request includes a request for figure information, the object detecting module 326 may set the detected facial area as the object extraction area. For example, if the request includes a request for product information, the object detecting module 326 may set an area with a designated size from the detected facial area as the object extraction area, based on the position of the detected facial area in the image frame (e.g., the first image frame) or the size of the detected facial area or the direction of face (e.g., the direction of the eyes, nose, or mouth). For example, if the request includes a request for text information, the object detecting module 326 may set an area with a designated size from the bottom or top of the image frame (e.g., the first image frame) as the object extraction area. For example, if the request includes a request for place information, the object detecting module 326 may set the entire image frame (e.g., the first image frame) as the object extraction area.

According to an embodiment, the object detecting module 326 may perform image analysis on the set object extraction area in the first image frame, detecting at least one first object. According to an embodiment, the at least one first object may include a face image, product image, text image, or place (or building or structure) image corresponding to each detected facial area.

According to an embodiment, the object detecting module 326 may extract first object information from the detected at least one first object. According to an embodiment, the first object information may include, e.g., the object type, size, shape, or color corresponding to each first object.

The processor 320 may extract meta information related to the broadcast content. The broadcast content may include the meta information. The processor 320 may extract the meta information from the received broadcast content. Upon receiving the image frame included in the broadcast content from the external electronic device 202, the processor 320 may send a request for the broadcast content-related meta information to the content server 208C and receive the meta information.

According to an embodiment, the meta information may include, e.g., the title of the broadcast content, broadcasting station, airtime, cast information (e.g., characters and their relationships, scenario, subtitles, etc.), filming site information, product placement (PPL) (e.g. clothing, accessories, foods, electronics, etc.), or text information (e.g., subtitles, news, breaking news, program guides, etc.).

The processor 320 may determine whether there is meta information matching the first object information at least partially based on the meta information. According to an embodiment, upon determining that there is the meta information matching the first object information, the processor 320 may provide the meta information matching the first object information as first service information. According to an embodiment, upon determining that there is no meta information matching the first object information, the processor 320 may transmit a request for first service information corresponding to the first object or first object information, including the first object or first object information, to the service server 208S. For example, the processor 320 may transmit the request to the service server 208S via the second communication interface 299.

In response to the transmission of the request, the processor 320 may receive the first service information corresponding to the first object or the first object information or first similar service information corresponding to the first object or the first object information from the service server 208S.

After receiving the first service or first similar service information, the processor 320 may determine whether the number of the detected at least one facial area is varied via the facial area determining module 324 and may determine whether a new facial area is detected.

According to an embodiment, the facial area determining module 324 may determine whether the number of the detected at least one facial area is varied in the image frame after the first image frame. Upon determining that the number of the detected at least one facial area is varied, the facial area determining module 324 may determine whether a new facial area is detected. For example, if the number of the detected at least one facial area increases, the facial area determining module 324 may determine that among the facial areas corresponding to the increased number, the facial area where no image analysis has been performed is the new facial area. For example, if the number of the detected at least one facial area decreases, the facial area determining module 324 may determine that among the facial areas corresponding to the decreased number, the facial area where no image analysis has been performed is the new facial area.

Upon detecting the new facial area, the processor 320 may perform image analysis based on the detected new facial area, via the object detecting module 326. According to an embodiment, the object detecting module 326 may set an object extraction area based on the detected at least one new facial area in the image frame (e.g., a second image frame) from which the new facial area has been detected among, e.g., the at least one image frame. Setting the object extraction area is the same as setting an object extraction area in the first image frame described above and, thus, is not described below.

According to an embodiment, the object detecting module 326 may perform image analysis on the object extraction area set in the second image frame, detecting at least one second object. According to an embodiment, the at least one second object may include a face image, product image, text image, or place (or building) image corresponding to each detected facial area.

According to an embodiment, the object detecting module 326 may extract second object information from the detected at least one second object. According to an embodiment, the second object information may include, e.g., the object type, size, shape, or color corresponding to each second object.

The processor 320 may determine whether there is meta information matching the second object information at least partially based on the meta information. According to an embodiment, upon determining that there is the meta information matching the second object information, the processor 320 may provide the meta information matching the second object information as second service information. According to an embodiment, upon determining that there is no meta information matching the second object information, the processor 320 may transmit a request for second service information corresponding to the second object or second object information, including the second object or second object information, to the service server 208S. For example, the processor 320 may transmit the request to the service server 208S via the second communication interface 299.

In response to the transmission of the request, the processor 320 may receive the second service information corresponding to the second object or the second object information or second similar service information corresponding to the second object or the second object information from the service server 208S.

According to an embodiment, the first service information or the second service information may include, e.g., figure information (e.g., celebrities, politicians, or entertainers), product information (e.g., fashion, home appliances, foods, household items, or vehicles), text information (e.g., news, news articles, papers, keywords, or tags), or place information (e.g., restaurants, beauty shops, travel sites, etc.) corresponding to each detected facial area.

According to an embodiment, the first similar service information or the second similar service information may include similar figure information, similar product information, similar text information, or similar place information corresponding to each detected facial area. For example, the similar service information may be information for which the similarity between the object or object information and the service information discovered in the same or similar category is a designated value or more.

The processor 320 may receive personalized service information or similar service information based on the user information about the electronic device 301.

According to an embodiment, the processor 320 may identify the user information about the electronic device 301. The user information, as personalized profile information, may be stored in the memory 330. According to an embodiment, the user information may include profile information in the user account or device use-based profile information. For example, the profile information in the user account may include the user account (e.g., ID/password), age, gender, country, region, address, family or friend information. For example, the device use-based profile information may include information about applications installed on the electronic device 301, log, use frequency, keyword, or web browser use history, view information, or various data analysis information analyzed per gender, personality, or age.

According to an embodiment, the processor 320 may select at least one recommendation service information category corresponding to the service information at least partially based on the user information. For example, the electronic device 301 may select the recommendation service information category based on the user information among recommendation service categories pre-stored in the memory 330. Table 1 shows example recommendation service information categories.

TABLE 1

| Extraction information | recommendation service category 1 | recommendation service category 2 | recommendation service category 3 |
|---|---|---|---|
| figure | movie VOD | news | shopping |
| goods | shopping | movie VOD | map |
| Place | travel package | restaurant booking/delivery | content VOD |
| text | news | video VOD | shopping |

Referring to Table 1, for example, if the detected object or object information is figure, and the recommendation service information categories based on the figure information are designated in the order of movie VOD, news, and shopping, the processor 320 may select movie VOD related to the figure information which is the detected object or object information as the recommendation service information.

According to an embodiment, the processor 320 may display a recommendation application corresponding to the selected at least one recommendation service information category on the display 360 (e.g., the display device 160) of the electronic device 301 at least partially based on the user information. For example, if the processor 320 selects movie VOD, which is related to the figure information which is the detected object or object information as the recommendation service information, and an application for executing the movie VOD is installed on the electronic device 301, recommendation applications more frequently used or depending on the priority designated by the user among applications capable of playing the movie VOD may be displayed on the display 360. The user may select one among the displayed recommendation applications and receive the service information or similar service information via the selected application.

The processor 320 or at least one component (e.g., the image obtaining module 322, the facial area determining module 324, or the object detecting module 326) included in the processor 320 may be configured as at least one piece of hardware or software to perform operations according to various embodiments of the present invention. If configured in software, the processor 320 or at least one component (e.g., the image obtaining module 322, the facial area determining module 324, or the object detecting module 326) included in the processor 320 may load, e.g., modules, programs, routines, command sets, or processes for performing operations according to various embodiments of the present invention, stored in the memory 330 (e.g., the middleware 144 of the memory 130) from the memory 330 and process them. The operations of the processor 320 are described below in greater detail with reference to FIGS. 4 and 11.

The memory 330 may include the whole or part of the memory 130 of FIG. 1. The memory 330 may include an image buffer storing the at least one image frame included in the broadcast content obtained from the image obtaining module 322. The memory 330 may store the user information. According to an embodiment, the memory 330 may store, e.g., temporary computation values that are generated during the course of image analysis via the processor 320 (e.g., the facial area determining module 324 or object detecting module 326).

The sound output device 340 (e.g., a speaker) may include the whole or part of the sound output device 155 of FIG. 1. If voice-based control is performed for receiving the broadcast content-related service information, a user interface may be provided via the input device 350 (e.g., a microphone) or the sound output device 340. For example, if a request for the broadcast content-related service information is received via the input device 350 (e.g., a microphone), a voice recognition control service by the voice input (command) may be performed, and the result may be output in voice or various sounds via the sound output device 340.

The input device 350 (e.g., a microphone, mouse, or keyboard) may include the whole or part of the input device 150 of FIG. 1. The input device 350 may be used as one of user interfaces (UIs) for receiving the broadcast content-related service information. For example, a user input for the request for the broadcast content-related service information may be received via the input device 350. According to an embodiment, the processor 320 may receive a user input for the request for the broadcast content-related service information via the user input device 350. For example, the user input may include an input signal received by the user's physical or mechanical manipulation via the input device 350 (e.g., a mouse or keyboard). For example, the user input may include an input voice (command) (e.g., "Who is that on TV?", "What's he wearing on TV?" or "Where is that city?") received through the input device 150 (e.g., a microphone).

The display device 360 may include the whole or part of the display device 160 of FIG. 1. The display device 360 may display a user interface (UI) for receiving the broadcast content-related service information. For example, the display device 360 may display the service information or similar service information.

Figure 4:
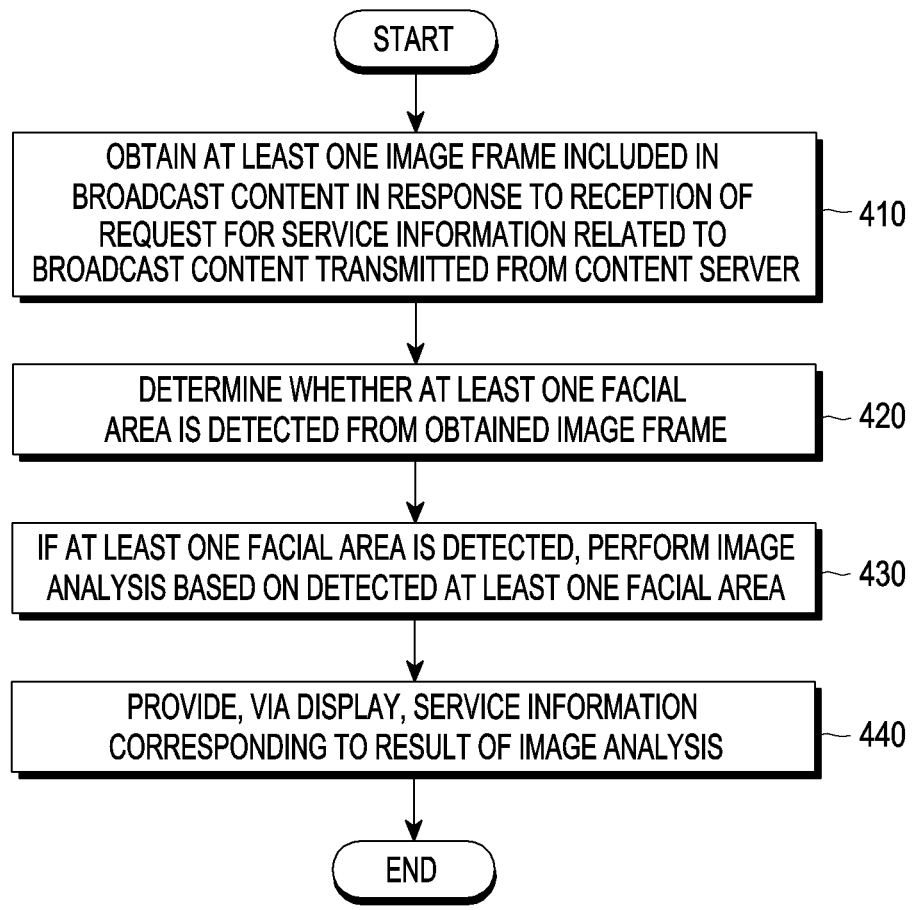
FIG. 4 is a flowchart illustrating a method of providing broadcast content-related service information by an electronic device according to various embodiments.

FIG. 4 is a flowchart illustrating a method of providing broadcast content-related service information by an electronic device according to various embodiments. The method may be performed by an electronic device (e.g., the electronic device 301) or a processor (e.g., the processor 320) of the electronic device.

Referring to FIG. 4, in operation 410, for example, the electronic device may obtain at least one image frame included in broadcast content in response to reception of a request for service information related to the broadcast content transmitted from a content server (e.g., the content server 208C).

According to an embodiment, when the broadcast content is output via an external electronic device (e.g., the external electronic device 202), the electronic device may transmit the request to the external electronic device and, in response to transmission of the request, may receive at least one image frame included in the broadcast content captured by the external electronic device from the external electronic device.

According to an embodiment, when the broadcast content is output via the electronic device, the electronic device may capture at least one image frame included in the broadcast content in response to reception of the request.

In operation 420, for example, the electronic device may determine whether at least one facial area is detected from the at least one image frame.

According to an embodiment, the electronic device may detect whether each frame includes a facial area using a face recognition technique or face recognition algorithm using less resources, rather than performing image analysis on each frame corresponding to the broadcast content.

In operation 430, for example, upon determining that the at least one facial area is detected, the electronic device may perform image analysis based on the detected at least one facial area.

According to an embodiment, the electronic device may set an object extraction area based on the detected at least one facial area in the image frame (e.g., a first image frame) from which the at least one facial area has been detected among, e.g., the at least one image frame. The electronic device may perform image analysis on the set object extraction area in the first image frame, detecting at least one first object. The electronic device may extract first object information from the detected at least one first object.

In operation 440, for example, the electronic device may provide service information corresponding to the result of image analysis via the display (e.g., the display 360).

According to an embodiment, the electronic device may extract meta information related to the broadcast content. The electronic device may determine whether there is meta information matching the first object information at least partially based on the meta information.

According to an embodiment, upon determining that there is the meta information matching the first object information, the electronic device may provide the meta information matching the first object information as first service information.

According to an embodiment, upon determining that there is no meta information matching the first object information, the electronic device may transmit a request for first service information corresponding to the first object or first object information, including the first object or first object information, to the service server.

According to an embodiment, in response to the transmission of the request, the electronic device may receive the first service information corresponding to the first object or the first object information or first similar service information corresponding to the first object or the first object information from the service server.

Figure 5A:
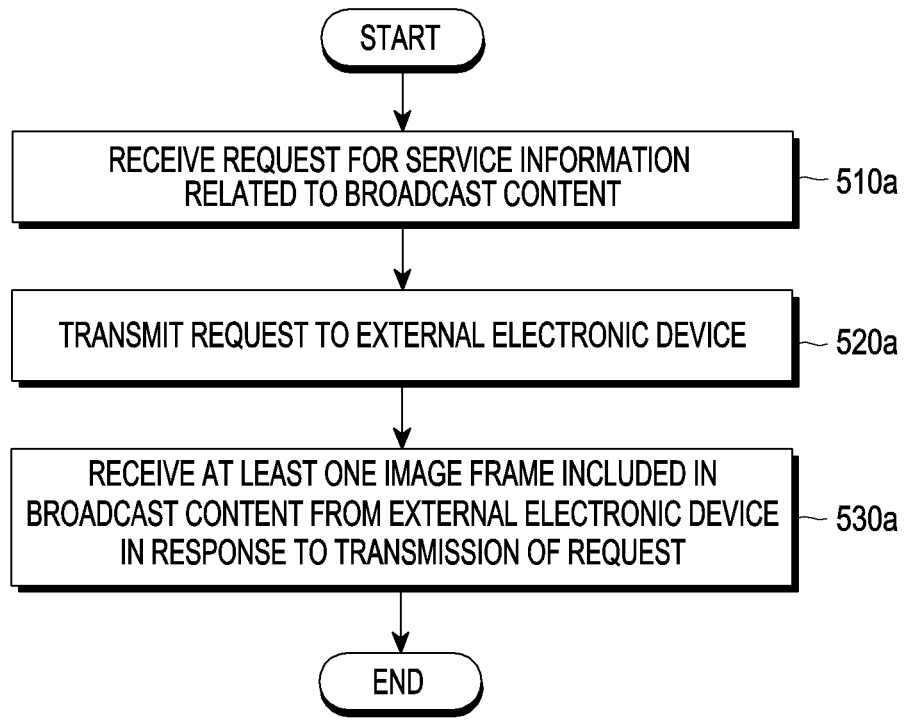
FIGS. 5A and 5B are flowcharts illustrating a method of providing broadcast content-related service information by an electronic device according to various embodiments.

FIG. 5A is a flowchart illustrating a method of providing broadcast content-related service information by an electronic device according to various embodiments. FIG. 5A is a detailed flowchart illustrating a method of obtaining an image frame as in operation 410 of FIG. 4. The method may be performed by an electronic device (e.g., the electronic device 301) or a processor (e.g., the processor 320) of the electronic device.

Referring to FIG. 5A, in operation 510*a*, for example, the electronic device may receive a request for service information related to broadcast content transmitted from a content server (e.g., the content server 208C).

According to an embodiment, the request may be generated upon receiving a user input for receiving the broadcast content-related service information or when an event occurs.

For example, the electronic device may receive a user input for the request via a user interface (UI) for receiving the broadcast content-related service information. According to an embodiment, the user input may include an input signal received by the user's physical or mechanical manipulation on an input device (e.g., the input device 350 (e.g., a mouse or keyboard)) of the electronic device, an input signal received by the user's touch, hovering or various types of touch gestures (e.g., a double-tap, drag, drag-and-drop, swipe, or flick) on the display (e.g., the display device 360 (e.g., a touchscreen)) of the electronic device, or an input voice (command) (e.g., "Who is that on TV?", "What's he wearing on TV?", or "Where is that city?") received by the user's utterance on an input device 350 (e.g., a microphone) of the electronic device.

For example, an event may occur for the electronic device to receive the broadcast content-related service information. The electronic device may automatically generate a request for the broadcast content-related service information when the event occurs. According to an embodiment, the event may include a variation in the number of at least one facial area detected from the at least one captured image frame. For example, the event may occur when the number of at least one facial area detected from the at least one image frame varies, and the electronic device may automatically generate the request according to the occurrence of the event.

According to an embodiment, the request may be generated when a designated condition for receiving the broadcast content-related service information is met.

For example, as the designated condition, a condition for event occurrence for receiving the broadcast content-related service information may be pre-designated, or the frequency of occurrence of the designated event may be preset. For example, the designated condition may include a designated time, the number, or respective numbers, of designated frames, detection of a designated figure, product, place, or text, a scene switch, or a combination thereof. For example, the electronic device may determine that the designated condition is met when the designated time (e.g., the time that the broadcast content starts) arrives, when reaching the designated number of frames (e.g., every 30 frames) or designated frame number (e.g., the nth frame of every scene), when the designated figure (e.g., a particular person), product (e.g., a fashion item, accessory, or general merchandise), place (e.g., a filming scene) or text (e.g., designation of a specific keyword) is detected, or when a scene switch occurs and, as the designated condition is met, may automatically generate the request. The electronic device may be performed to automatically receive the service upon receiving a user input (e.g., an "Auto On" touch) to automatically receive the service information.

In operation 520*b*, for example, the electronic device may transmit the request to an external electronic device (e.g., the external electronic device 202).

For example, if the broadcast content transmitted from the content server (e.g., the content server 208C) is output via the external electronic device, the electronic device may transmit a request for the broadcast content-related service information to the external electronic device.

In operation 520*c*, for example, the electronic device may receive at least one image frame included in the broadcast content from the external electronic device in response to transmission of the request.

Figure 5B:
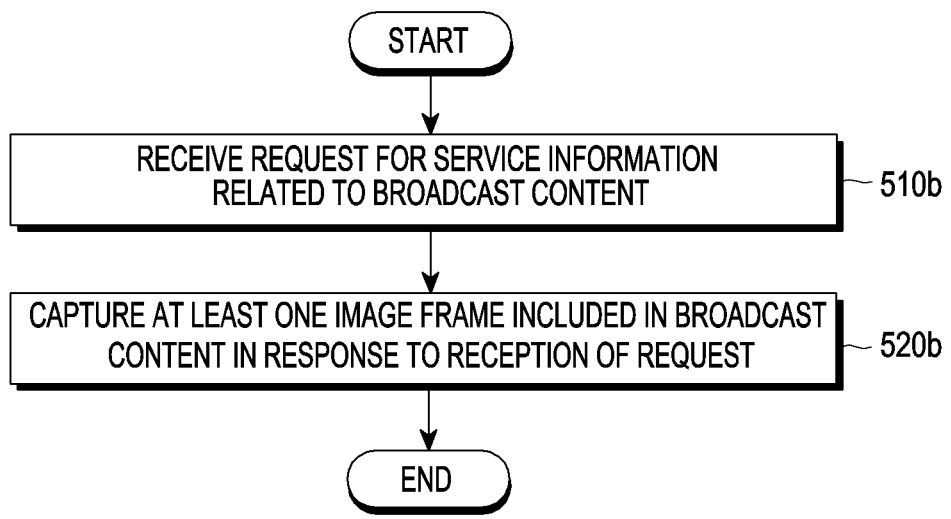

FIG. 5B is a flowchart illustrating a method of providing broadcast content-related service information by an electronic device according to various embodiments. FIG. 5B is a detailed flowchart illustrating a method of obtaining an image frame as in operation 410 of FIG. 4. The method may be performed by an electronic device (e.g., the electronic device 301) or a processor (e.g., the processor 320) of the electronic device.

Referring to FIG. 5B, in operation 510b, for example, the electronic device may receive a request for service information related to broadcast content transmitted from a content server (e.g., the content server 208C). Operation 510b is the same as operation 510a of FIG. 5A, and no description thereof is thus given below.

In operation 520b, for example, the electronic device may capture at least one image frame included in the broadcast content in response to reception of the request.

For example, if the broadcast content transmitted from the content server (e.g., the content server 208C) is output through the electronic device, and a request for the broadcast content-related service information is received, the electronic device may capture at least one image frame included in the broadcast content received from the content server using the image obtaining module (e.g., the image obtaining module 322) of the processor.

Figure 6:
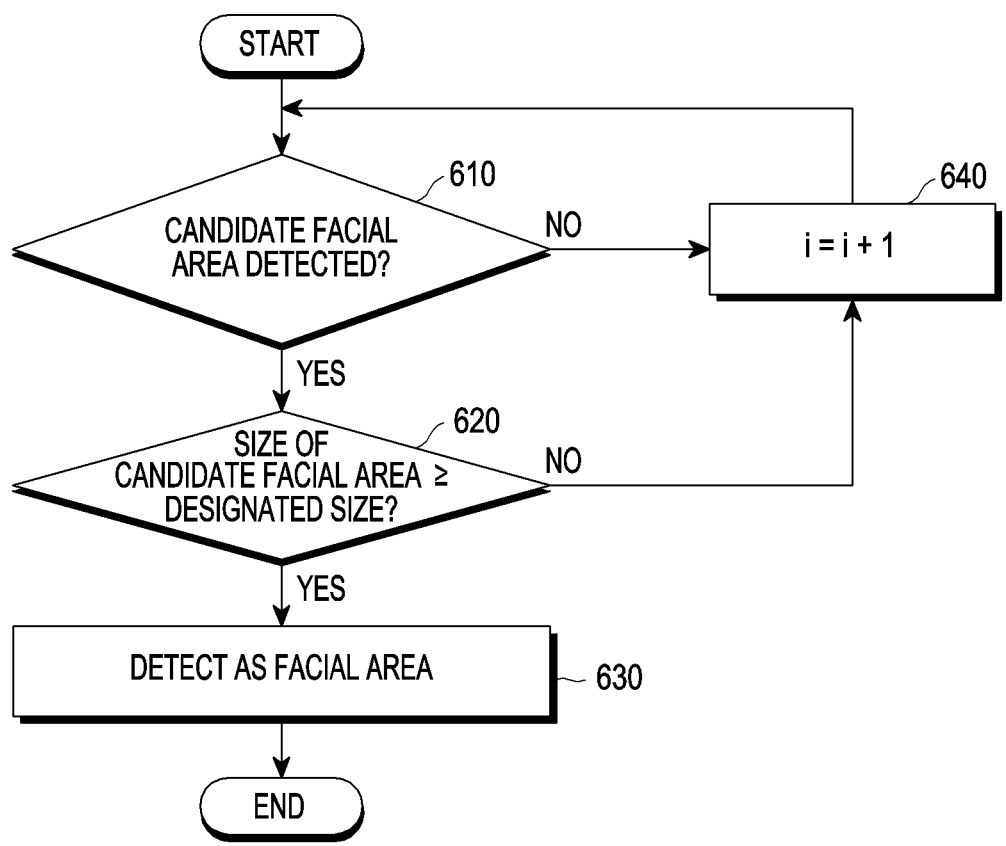
FIG. 6 is a flowchart illustrating a method of providing broadcast content-related service information by an electronic device according to various embodiments.

FIG. 6 is a flowchart illustrating a method of providing broadcast content-related service information by an electronic device according to various embodiments. FIG. 6 is a detailed flowchart illustrating a method of determining whether a facial area is detected as in operation 420 of FIG. 4. The method may be performed by an electronic device (e.g., the electronic device 301) or a processor (e.g., the processor 320) of the electronic device.

Referring to FIG. 6, in operation 610, for example, if the image frame included in the broadcast content is obtained in response to reception of a request for service information related to the broadcast content transmitted from a content server (e.g., the content server 208C), the electronic device may determine whether at least one candidate facial area is detected from the image frame (e.g., an ith image frame where i is a natural number). For example, the electronic device may perform face recognition analysis on the image frame (e.g., the ith image frame) using a face recognition technique or face recognition algorithm using fewer resources than the overall image analysis, thereby detecting whether at least one candidate facial area is present in the image frame. In operation 610, upon detecting the at least one candidate facial area in the image frame, the electronic device may perform operation 620 and, if not, operation 640.

In operation 620, for example, upon detecting the at least one candidate facial area in the image frame (e.g., the ith image frame), the electronic device may compare the size of the at least one candidate facial area with a designated size. For example, the electronic device may determine whether the size of the detected at least one candidate facial area is the designated size or more. In operation 620, the electronic device may perform operation 630 if the size of the at least one candidate facial area is the designated size or more in operation 620 or operation 640 if the size of the at least one candidate facial area is less than the designated size.

The designated size may be pre-designated by the user or may be preset by the electronic device.

In operation 630, for example, if the size of the at least one candidate facial area is the designated size or more, the electronic device may detect the at least one candidate facial area as the at least one facial area.

In operation 640, for example, if the at least one candidate facial area is not detected from the image frame (e.g., the ith image frame, where i is a natural number) or if the size of the detected at least one candidate facial area is less than the designated size, the electronic device may obtain the next image frame (the i+1th image frame) and repeat operation 610. For example, if the at least one candidate facial area is not detected in the ith image frame or the size of the detected at least one candidate facial area is less than the designated size, the electronic device may determine that the at least one facial area is not detected in the ith image frame, obtain the next image frame, the i+1th image, and repeat operation 610 and its subsequent operations.

According to an embodiment, in a case where the broadcast content-related service information is provided in the auto mode, if the at least one candidate facial area is not detected from the ith image frame or if the size of the detected at least one candidate facial area is less than the designated size, the electronic device may automatically repeat operation 640, through to the last image frame included in the broadcast content after the ith image frame obtained corresponding to the request or until a termination signal for providing the service information is received.

According to an embodiment, in a case where the broadcast content-related service information is provided in the manual mode, if the at least one candidate facial area is not detected from the ith image frame or if the size of the detected at least one candidate facial area is less than the designated size, the electronic device may obtain at least one previous image frame (e.g., N image frames prior to the ith image frame, where N is a natural number) or at least one subsequent image frame (e.g., M image frames subsequent to the ith image frame) to the ith image frame obtained corresponding to the request and may repeat operation 640. For example, N or M may be previously set by the electronic device or the user.

Figure 7:
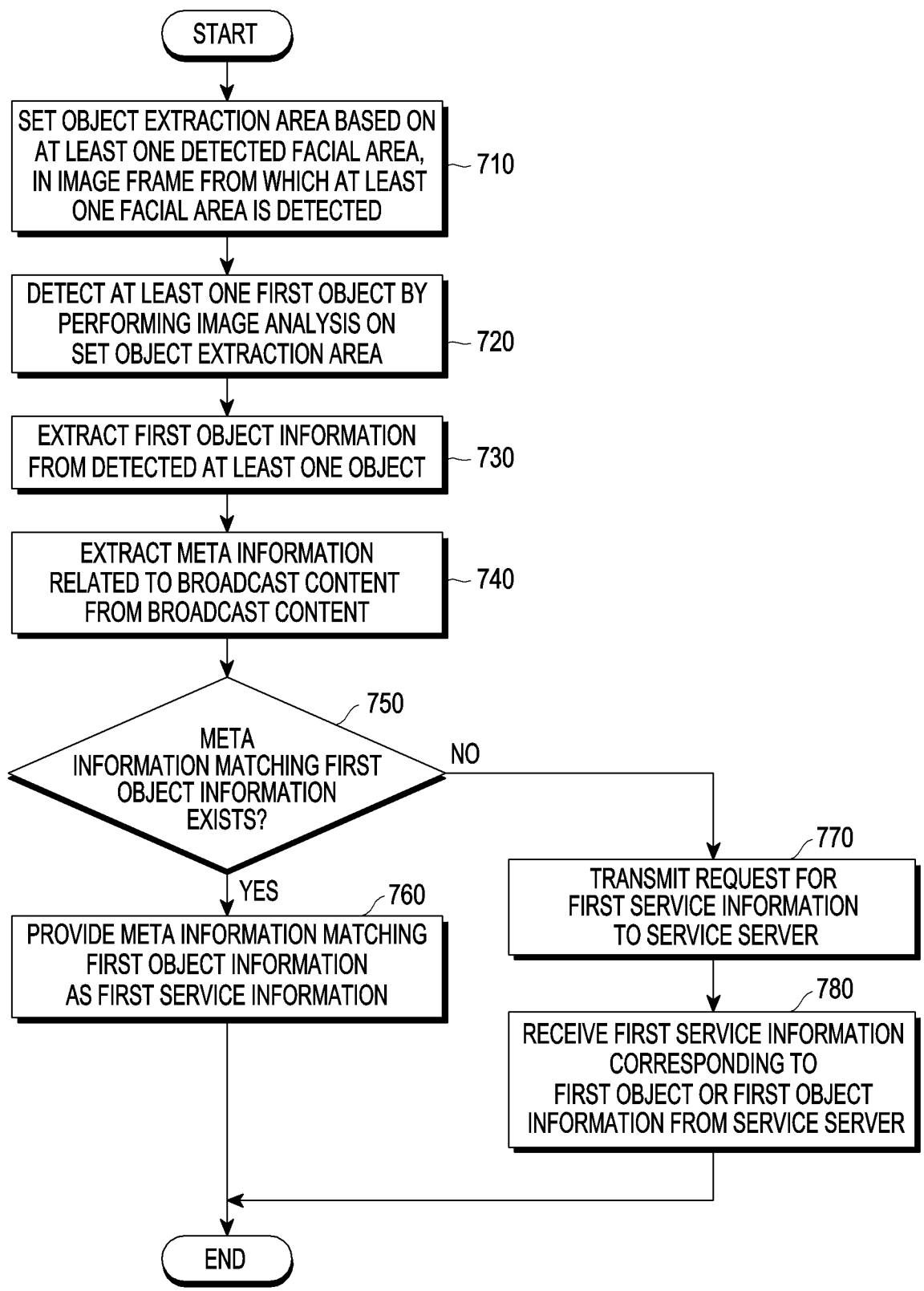
FIG. 7 is a flowchart illustrating a method of providing broadcast content-related service information by an electronic device according to various embodiments.

FIG. 7 is a flowchart illustrating a method of providing broadcast content-related service information by an electronic device according to various embodiments. FIG. 7 is a detailed flowchart illustrating a method of performing image analysis as in operation 530 of FIG. 4 and a method of providing service information as in operation 440 of FIG. 4. The method may be performed by an electronic device (e.g., the electronic device 301) or a processor (e.g., the processor 320) of the electronic device.

Referring to FIG. 7, in operation 710, for example, the electronic device may set an object extraction area based on at least one facial area detected in the image frame (e.g., the first image frame) from which at least one facial area is detected among the at least one image frame included in broadcast content transmitted from a content server (e.g., the content server 208C).

According to an embodiment, the electronic device may be configured to differ depending on requests for broadcast content-related service information. For example, if the request includes a request for figure information, the electronic device may set the detected facial area as the object extraction area. For example, if the request includes a request for product information, the electronic device may set an area with a designated size from the detected facial area as the object extraction area, based on the position of the detected facial area in the image frame (e.g., the first image frame) or the size of the detected facial area or the direction of face (e.g., the direction of the eyes, nose, or mouth). For example, if the request includes a request for text information, the electronic device may set an area with a designated size from the bottom or top of the image frame (e.g., the first image frame) as the object extraction area. For example, if the request includes a request for place information, the electronic device may set the entire image frame (e.g., the first image frame) as the object extraction area.

In operation 720, for example, the electronic device may detect at least one first object by performing image analysis on the set object extraction area.

According to an embodiment, the at least one first object may include a face image, product image, text image, or place (or building or structure) image corresponding to each detected facial area.

In operation 730, for example, the electronic device may extract first object information from the detected at least one first object.

According to an embodiment, the first object information may include, e.g., the object type, size, shape, or color corresponding to each first object.

In operation 740, for example, the electronic device may extract meta information related to the broadcast content from the broadcast content.

According to an embodiment, the broadcast content may include the meta information. The electronic device may extract the meta information from the received broadcast content.

According to an embodiment, upon receiving the image frame included in the broadcast content from an external electronic device (e.g., the external electronic device 202), the electronic device may send a request for the broadcast content-related meta information to the content server 208C and receive the meta information.

According to an embodiment, the meta information may include, e.g., the title of the broadcast content, broadcasting station, airtime, cast information (e.g., characters and their relationships, scenario, subtitles, etc.), filming site information, product placement (PPL) (e.g. clothing, accessories, foods, electronics, etc.), or text information (e.g., subtitles, news, breaking news, program guides, etc.).

In operation 750, for example, the electronic device may determine whether there is meta information matching the first object information at least partially based on the meta information. For example, the electronic device may compare the first object information with each piece of data of the meta information, determining whether it matches the first object information. In operation 750, the electronic device may perform operation 760 if there is determined to be meta information matching the first object information or operation 770 if there is determined to be no meta information matching the first object information.

In operation 760, for example, upon determining that there is the meta information matching the first object information, the electronic device may provide the meta information matching the first object information as first service information.

In operation 770, for example, upon determining that there is no meta information matching the first object information, the electronic device may transmit a request for second service information corresponding to the first object or first object information, including the first object or first object information, to the service server (e.g., the service server 208S).

In operation 780, for example, in response to the transmission of the request, the electronic device may receive the first service information corresponding to the first object or the first object information or first similar service information corresponding to the first object or the first object information from the service server.

According to an embodiment, the first service information may include, e.g., figure information (e.g., celebrities, politicians, or entertainers), product information (e.g., fashion, home appliances, foods, household items, or vehicles), text information (e.g., news, news articles, papers, keywords, or tags), or place information (e.g., restaurants, beauty shops, travel sites, etc.) corresponding to each detected facial area.

According to an embodiment, the first similar service information may include similar figure information, similar product information, similar text information, or similar place information corresponding to each detected facial area. For example, the first similar service information may be information for which the similarity between the first object or first object information and the same category or similar category of service information is a designated value or more.

Figure 8:
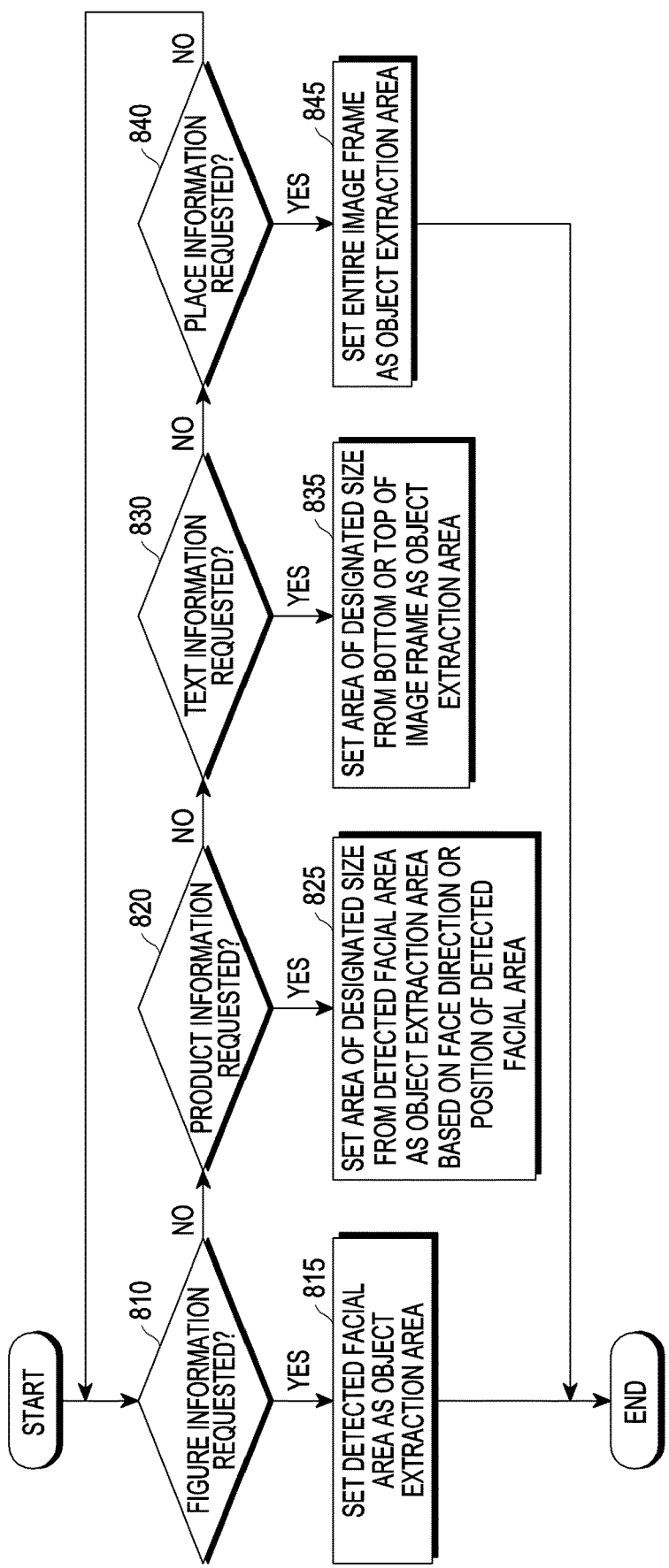
FIG. 8 is a flowchart illustrating a method of providing broadcast content-related service information by an electronic device according to various embodiments.

FIG. 8 is a flowchart illustrating a method of providing broadcast content-related service information by an electronic device according to various embodiments. FIG. 8 is a detailed flowchart illustrating a method of setting an object extraction area as in operation 710 of FIG. 7. The method may be performed by an electronic device (e.g., the electronic device 301) or a processor (e.g., the processor 320) of the electronic device.

Referring to FIG. 8, in operation 810, for example, the electronic device may determine whether a request for service information related to broadcast content transmitted from a content server (e.g., the content server 208C) includes a request for figure information. In operation 810, the electronic device may perform operation 815 if the request includes a request for figure information and operation 820 if not.

In operation 815, for example, if the request for the broadcast content-related service information includes a request for figure information, the electronic device may set the detected at least one facial area as the object extraction area.

In operation 820, for example, the electronic device may determine whether the request for the broadcast content-related service information includes a request for product information. In operation 820, the electronic device may perform operation 825 if the request includes a request for product information and operation 830 if not.

In operation 825, if the request includes a request for product information, the electronic device may set an area with a designated size from the detected at least one facial area as the object extraction area, based on the position (e.g., x and y coordinates) of the detected facial area in the image frame (e.g., the first image frame) or the size of the detected facial area or the direction of face (e.g., the direction of the eyes, nose, or mouth). For example, if the direction of face is a vertical direction, the electronic device may set the size designated in the vertical direction as the object extraction area based on the position of the facial area. Likewise, if the direction of face is a horizontal direction, the electronic device may set the size designated in the horizontal direction as the object extraction area based on the position of the facial area.

In operation 830, for example, the electronic device may determine whether the request for the broadcast content-related service information includes a request for text information. In operation 830, the electronic device may perform operation 835 if the request includes a request for text information and operation 840 if not.

In operation 835, if the request includes a request for text information, the electronic device may set an area with a designated size from the bottom or top of the image frame (e.g., the first image frame) as the object extraction area.

In operation 840, for example, the electronic device may determine whether the request for the broadcast content-related service information includes a request for place information. In operation 840, the electronic device may perform operation 845 if the request includes a request for place information and operation 810 if not.

In operation 845, if the request includes a request for text information, the electronic device may set the entire image frame (e.g., the first image frame) as the object extraction area.

Although FIG. 8 has been described above in the order of operations 810, 820, 830, and 840, the operations may be performed in any other orders without limitation thereto.

Figure 9:
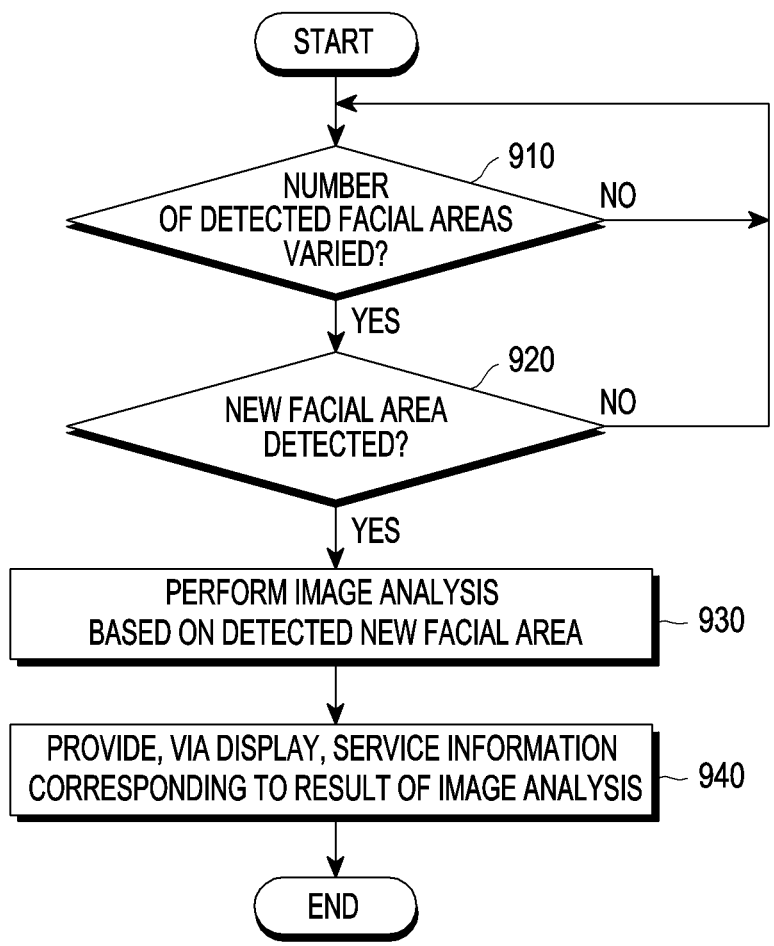
FIG. 9 is a flowchart illustrating a method of providing broadcast content-related service information by an electronic device according to various embodiments.

FIG. 9 is a flowchart illustrating a method of providing broadcast content-related service information by an electronic device according to various embodiments. The method may be performed by an electronic device (e.g., the electronic device 301) or a processor (e.g., the processor 320) of the electronic device.

Referring to FIG. 9, in operation 910, for example, after detecting at least one facial area in at least one image frame included in broadcast content transmitted from a content server (e.g., the content server 208C), the electronic device may determine whether the number of the detected at least one facial area in the at least one image frame is varied. In operation 910, if the number of the detected at least one facial area is varied, the electronic device may perform operation 920 but, if not varied, operation 910.

In operation 920, for example, the electronic device may determine whether a new facial area is detected if the number of the detected at least one facial area is determined to be varied. In operation 920, when the new facial area is detected, the electronic device may perform operation 930 but, if not detected, repeat operation 910.

According to an embodiment, if the number of the detected at least one facial area increases, the electronic device may determine that among the facial areas corresponding to the increased number, the facial area where no image analysis has been performed is the new facial area.

According to an embodiment, if the number of the detected at least one facial area decreases, the electronic device may determine that among the facial areas corresponding to the decreased number, the facial area where no image analysis has been performed is the new facial area.

In operation 930, for example, upon detecting the new facial area, the electronic device may perform image analysis based on the detected new facial area.

According to an embodiment, the electronic device may set an object extraction area based on the detected at least one new facial area in the image frame (e.g., a second image frame) from which the at least one new facial area has been detected among, e.g., the at least one image frame. Setting the object extraction area is the same as that described above in connection with FIG. 8 and, thus, is not described below.

According to an embodiment, the electronic device may perform image analysis on the set object extraction area in the second image frame, detecting at least one second object. The electronic device may extract second object information from the detected at least one second object.

In operation 940, for example, the electronic device may provide service information corresponding to the result of image analysis via the display (e.g., the display 360).

According to an embodiment, the electronic device may extract meta information related to the broadcast content. If the meta information has been already extracted and stored, the operation may be omitted. The electronic device may determine whether there is meta information matching the second object information at least partially based on the meta information.

According to an embodiment, upon determining that there is the meta information matching the second object information, the electronic device may provide the meta information matching the first object information as second service information.

According to an embodiment, upon determining that there is no meta information matching the second object information, the electronic device may transmit a request for second service information corresponding to the second object or second object information, including the second object or second object information, to the service server.

According to an embodiment, in response to the transmission of the request, the electronic device may receive the second service information corresponding to the second object or the second object information or second similar service information corresponding to the second object or the second object information from the service server.

Figure 10:
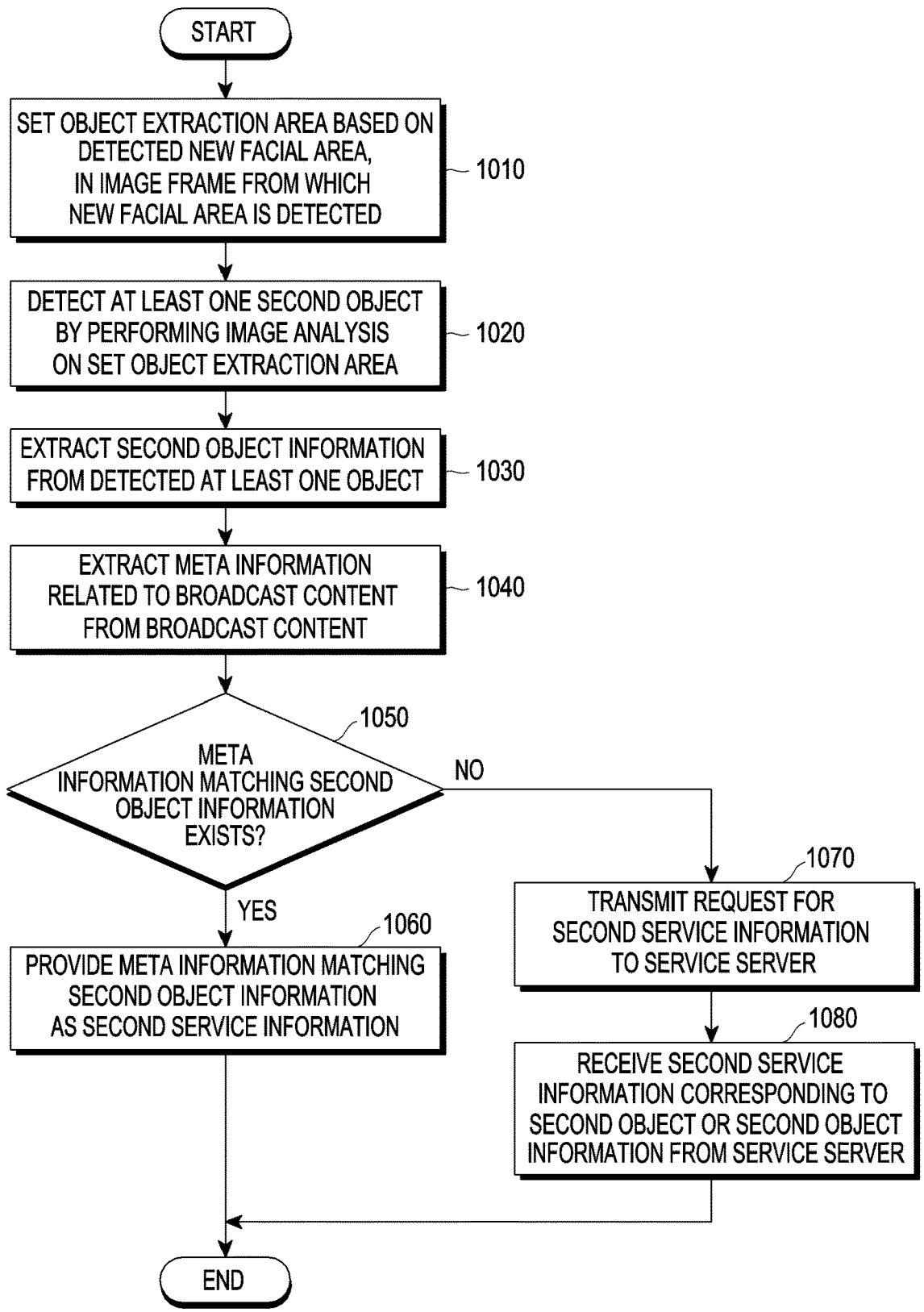
FIG. 10 is a flowchart illustrating a method of providing broadcast content-related service information by an electronic device according to various embodiments.

FIG. 10 is a flowchart illustrating a method of providing broadcast content-related service information by an electronic device according to various embodiments. FIG. 10 is a detailed flowchart illustrating a method of performing image analysis as in operation 930 of FIG. 9 and a method of providing service information as in operation 940 of FIG. 9. The method may be performed by an electronic device (e.g., the electronic device 301) or a processor (e.g., the processor 320) of the electronic device.

Referring to FIG. 10, in operation 1010, for example, after detecting at least one facial area in at least one image frame included in broadcast content transmitted from a content server (e.g., the content server 208C), the electronic device may set an object extraction area based on a detected new facial area in the image frame (e.g., a second image frame) from which the new facial area has been detected among the at least one image frame. Setting the object extraction area is the same as that described above in connection with FIG. 8 and, thus, is not described below.

In operation 1020, for example, the electronic device may detect at least one second object by performing image analysis on the set object extraction area.

According to an embodiment, the at least one second object may include a face image, product image, text image, or place (or building or structure) image corresponding to each detected facial area.

In operation 1030, for example, the electronic device may extract second object information from the detected at least one second object.

According to an embodiment, the second object information may include, e.g., the object type, size, shape, or color corresponding to each second object.

In operation 1040, for example, the electronic device may extract meta information related to the broadcast content from the broadcast content.

According to an embodiment, the broadcast content may include the meta information. The electronic device may extract the meta information from the received broadcast content.

According to an embodiment, upon receiving the image frame included in the broadcast content from an external electronic device (e.g., the external electronic device 202), the electronic device may send a request for the broadcast content-related meta information to the content server 208C and receive the meta information.

According to an embodiment, the meta information may include, e.g., the title of the broadcast content, broadcasting station, airtime, cast information (e.g., characters and their relationships, scenario, subtitles, etc.), filming site information, product placement (PPL) (e.g. clothing, accessories, foods, electronics, etc.), or text information (e.g., subtitles, news, breaking news, program guides, etc.).

If the meta information for the broadcast content has been already extracted and stored, operation 1040 may be omitted.

In operation 1050, for example, the electronic device may determine whether there is meta information matching the second object information at least partially based on the meta information. For example, the electronic device may compare the second object information with each piece of data of the meta information, determining whether it matches the second object information. In operation 1050, the electronic device may perform operation 1060 if there is determined to be meta information matching the second object information or operation 1070 if there is determined to be no meta information matching the second object information.

In operation 1060, for example, upon determining that there is the meta information matching the second object information, the electronic device may provide the meta information matching the second object information as second service information.

In operation 1070, for example, upon determining that there is no meta information matching the second object information, the electronic device may transmit a request for second service information corresponding to the second object or second object information, including the first object or first object information, to the service server (e.g., the service server 208S).

In operation 1080, for example, in response to the transmission of the request, the electronic device may receive the second service information corresponding to the second object or the second object information or second similar service information corresponding to the second object or the second object information from the service server.

According to an embodiment, the second service information may include, e.g., figure information (e.g., celebrities, politicians, or entertainers), product information (e.g., fashion, home appliances, foods, household items, or vehicles), text information (e.g., news, news articles, papers, keywords, or tags), or place information (e.g., restaurants, beauty shops, travel sites, etc.) corresponding to each detected facial area.

According to an embodiment, the second similar service information may include similar figure information, similar product information, similar text information, or similar place information corresponding to each detected facial area. For example, the second similar service information may be information for which the similarity between the second object or second object information and the same category or similar category of service information is a designated value or more.

Figure 11:
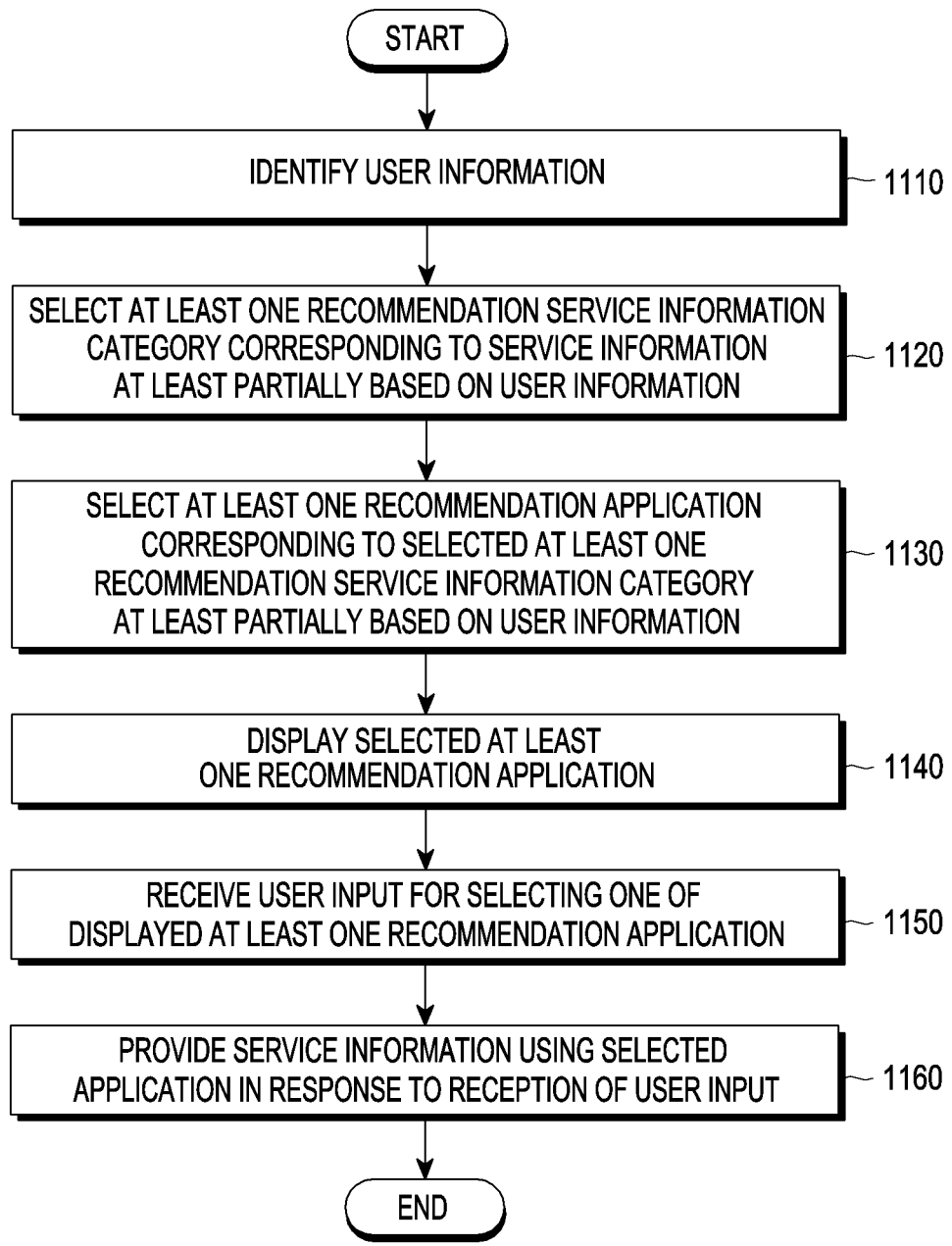
FIG. 11 is a flowchart illustrating a method of providing broadcast content-related service information by an electronic device according to various embodiments.

FIG. 11 is a flowchart illustrating a method of providing broadcast content-related service information by an electronic device according to various embodiments. The method may be performed by an electronic device (e.g., the electronic device 301) or a processor (e.g., the processor 320) of the electronic device.

Referring to FIG. 11, in operation 1110, for example, the electronic device may identify user information about the electronic device.

According to an embodiment, the user information may include profile information in the user account or device use-based profile information. For example, the profile information in the user account may include the user account (e.g., ID/password), age, gender, country, region, address, family or friend information. For example, the device use-based profile information may include information about applications installed on the electronic device 301, log, use frequency, keyword, or web browser use history, view information, or various data analysis information analyzed per gender, personality, or age.

In operation 1120, for example, the electronic device may select at least one recommendation service information category corresponding to the service information at least partially based on the user information.

According to an embodiment, the electronic device may select the recommendation service information category based on the user information among recommendation service categories pre-stored in the memory 330.

In operation 1130, for example, the electronic device may select a recommendation application corresponding to the selected at least one recommendation service information category at least partially based on the user information.

In operation 1140, for example, the electronic device may display the selected at least one recommendation application on the display 360 (e.g., the display device 160) of the electronic device 301.

According to an embodiment, among applications capable of providing broadcast content-related service information or similar service information, installed on the electronic device, a recommendation application which is more frequently used may be selected or a recommendation application may be selected depending on the priority designated by the user.

In operation 1150, for example, the electronic device may receive a user input for selecting the displayed at least one recommendation application.

In operation 1160, for example, the electronic device may provide service information via the application selected by receiving the user input.

Figure 12:
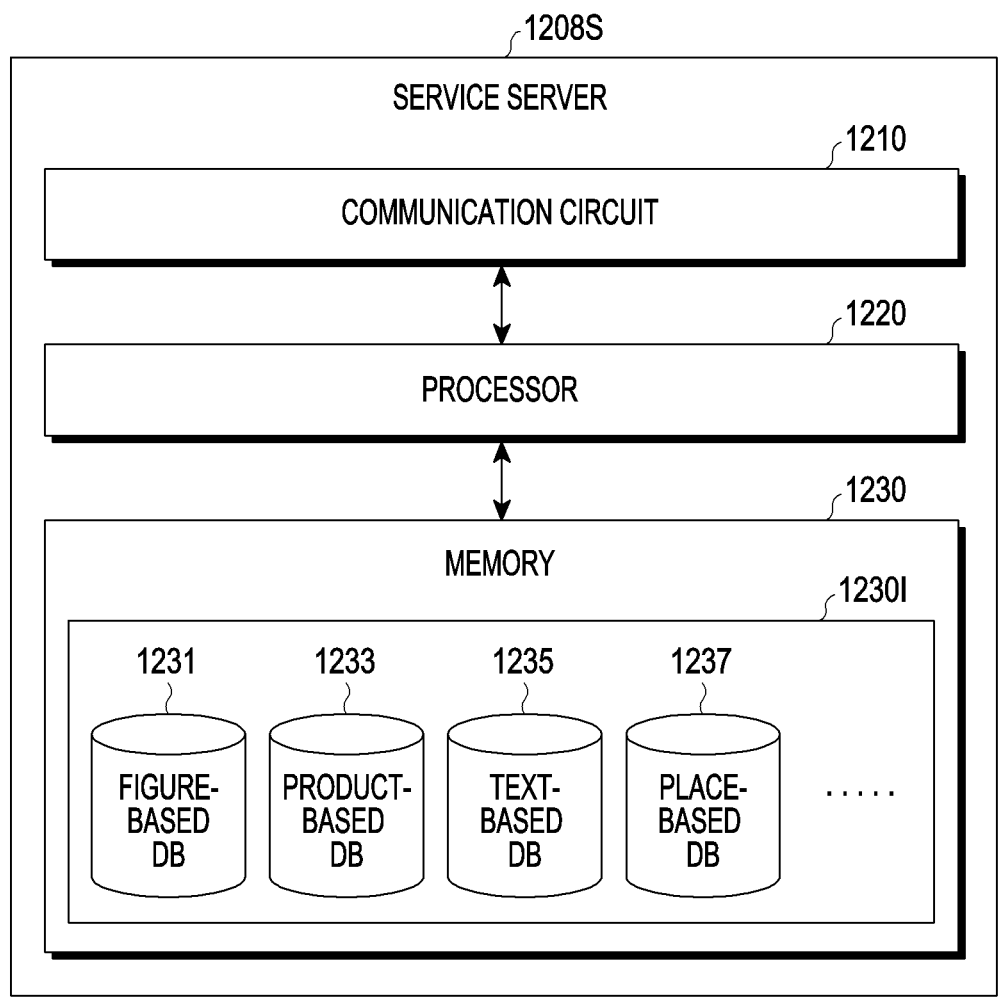
FIG. 12 is a block diagram illustrating a service server according to various embodiments.

FIG. 12 is a block diagram illustrating a service server according to various embodiments. FIG. 12 is a block diagram illustrating a service server 1208S according to various embodiments.

Referring to FIG. 12, a service server 1208S may include at least one of a communication circuit 1210, a processor 1220, or a memory 1230. FIG. 12 illustrates only components related to embodiments of the present invention, and other components than the above-listed components may also be included. For example, FIG. 12 may include the whole or part of the electronic device 101 shown in FIG. 1 or the service server 208S shown in FIG. 2.

The communication circuit 1210 may include the whole or part of the communication module 190 of FIG. 1. For example, the communication circuit 310 may also be termed a communication unit or communication module, including a communication unit or communication module as part thereof, or may configure a communication unit or communication module.

According to an embodiment, the communication circuit 1210 may provide a packet data (or Internet protocol)-based service. For example, the communication circuit 1210 may communicate with at least one external electronic device (e.g., the electronic device 301, the electronic device 202 or server 106, the content server 208C, service server 208S, voice recognition control server 208V, or IoT server 208N) connected with a second network (e.g., the second network 299). For example, the communication circuit 1210 may include at least one of, e.g., a computer network (e.g., LAN or WAN), internet, or a telephone network.

The processor 1220 may overall control the service server 1208S. The processor 1220 may include the whole or part of the processor 120 shown in FIG. 1.

According to an embodiment, the processor 1220 may receive a request for service information related to broadcast content transmitted from a content server 208C from the electronic device 301 or external electronic device 202 and, in response to reception of the request, search a database 1230I in the memory 1230 for service information corresponding to the request, and transmit the service information to the electronic device 301 or external electronic device 202 that has requested the service information. Operations of the processor 1220 are described below in detail with reference to FIG. 13.

The memory 1230 may include at least one database 1230I (e.g., an item database (DB)) storing various pieces of service information of various categories. The item DB 1230I may store pieces of service information classified per category. For example, the item DB 1230I may include a figure-based DB 1231, a product-based DB 1233, a text-based DB 1235, or a place-based DB 1237. The item DB 1230I is not limited thereto and may further include various categories of DBs or may be broken down.

Figure 13:
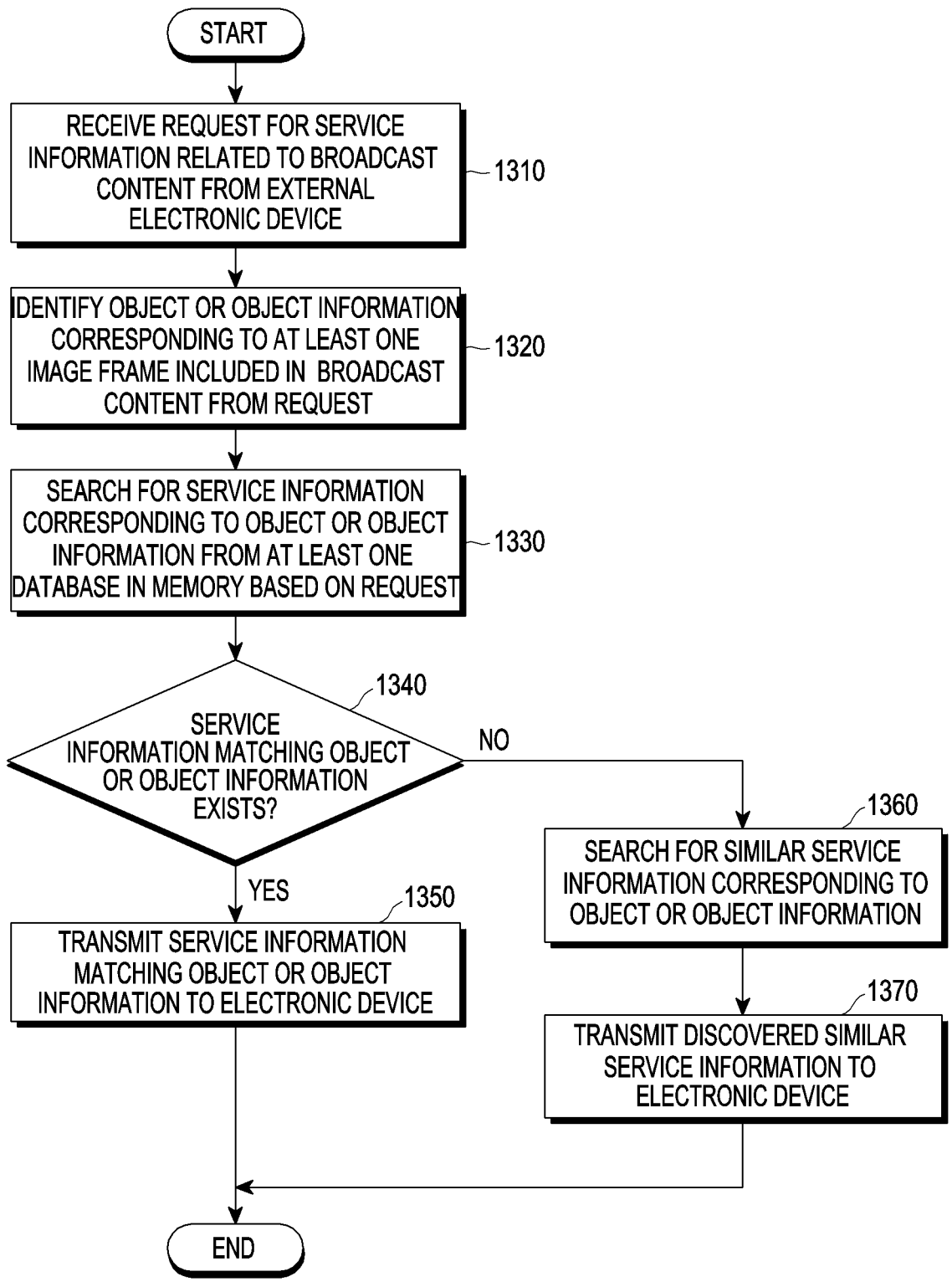
FIG. 13 is a flowchart illustrating a method of providing broadcast content-related service information by a service server according to various embodiments.

FIG. 13 is a flowchart illustrating a method of providing broadcast content-related service information by a service server according to various embodiments. The method may be performed by at least one of a service server (e.g., the service server 1208S) or a processor (e.g., the processor 1220) of the service server.

Referring to FIG. 13, in operation 1310, for example, the service server may receive a request for service information related to broadcast content transmitted from an electronic device (e.g., the electronic device 301) or an electronic device (e.g., the external electronic device 202).

In operation 1320, for example, in response to reception of the request, the service server may identify an object or object information corresponding to at least one image frame included in the broadcast content from the request.

In operation 1330, for example, the service server may search at least one database in the memory for service information corresponding to the object or object information.

In operation 1340, for example, the service server may determine whether there is service information matching the object or object information based on the discovered service information. In operation 1340, if there is service information matching the object or object information, operation 1350 may be performed and, if not, operation 1360 may be performed.

In operation 1350, for example, if there is service information matching the object or object information, the service server may transmit the service information matching the object or object information to the electronic device that has requested the service information.

In operation 1360, for example, if there is no service information matching the object or object information, the service server may search for similar service information corresponding to the object or object information in the same or similar category to the object or object information.

According to an embodiment, the similar service information may be information for which the similarity between the object or object information and the service information discovered in the same or similar category is a designated value or more.

In operation 1370, for example, the service server may transmit the discovered similar service information to the electronic device that has requested the service information.

Figure 14:
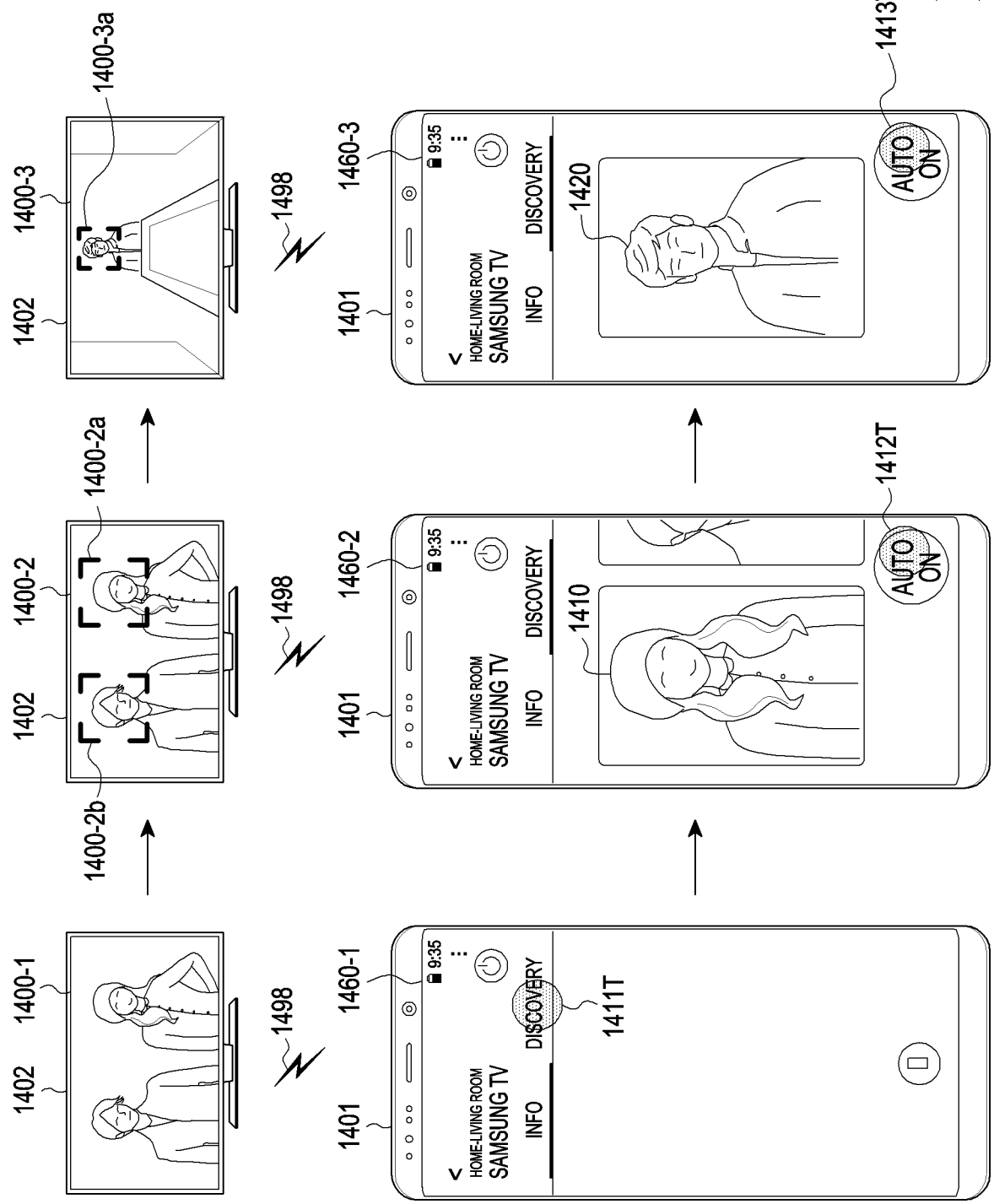
FIG. 14 is a view illustrating a user interface for providing broadcast content-related service information by an electronic device and an external electronic device according to various embodiments.

FIG. 14 is a view illustrating a user interface for providing broadcast content-related service information by an electronic device and an external electronic device according to various embodiments. In FIG. 14, an electronic device 1401 may include the whole or part of the electronic device 301 of FIG. 3, and an external electronic device 1402 may include the whole or part of the external electronic device 202 of FIG. 2. The electronic device 1401 and external electronic device 1402 may communicate via a first network 1498 (e.g., the first network 289).

Referring to FIG. 14, while viewing broadcast content output via the external electronic device 1402 (e.g., a smart TV), the user of the electronic device 1401 may perform an application (e.g., Samsung TV™) for receiving the broadcast content-related service information. For example, if the user touches (1411T) a menu (e.g., "DISCOVERY") for receiving the service information on the screen 1460-1 of the application (e.g., Samsung TV™) executed on the electronic device 1401, the electronic device 1401 may transmit a request for the broadcast content-related service information to the external electronic device 1402 in response to reception of the touch 1411T. The external electronic device 1402 may capture at least one image frame 1400-1, 1400-2, and 1400-3 included in the broadcast content in response to reception of the request and determine whether a facial area is detected in the at least one image frame. For example, upon detecting at least one facial area 1400-2a and 1400-2b in the image frame 1400-2, the external electronic device 1402 may perform image analysis based on the facial area 1400-2a and 1400-2b and transmit service information (e.g., figure information 1410) corresponding to the result of analysis of the image (e.g., the facial area 1400-2a) to the electronic device 1401.

The electronic device 1401 may receive the service information (e.g., the figure information 1410) from the external electronic device 1402 and display the service information on the screen 1460-2 of the application (e.g., Samsung TV™). The auto mode may be performed to be able to receive the service information for the broadcast content upon touching (1412T) an icon (e.g., AUTO ON) for performing the auto mode for providing the service information on the screen 1460-2. The icon (e.g., AUTO ON) may include a toggle function. For example, if the icon (e.g., AUTO ON) is touched again in the activated state, it may switch back into the manual mode.

While the electronic device 1401 operates in the auto mode, the external electronic device 1402 may determine whether the number of facial areas detected in at least one image frame included in the broadcast content is varied and, if the number of facial areas is varied, it may determine whether it is a new facial area. For example, the external electronic device 1402 may determine that the number of facial areas 1400-2a and 1400-2b detected in the image frame 1400-2 and the number of facial areas 1400-3a detected in the image frame 1400-3 are varied and, if the facial area 1400-3a corresponding to the varied number differs from the previously detected facial areas 1400-2a and 1400-2b, the facial area 1400-3a detected in the image frame 1400-3 may be determined to be the new facial area. If the face corresponding to the varied number is determined to be the new facial area (e.g., 1400-3a), the external electronic device 1402 may perform image analysis based on the detected new facial area (e.g., 1400-3a) and transmit service information (e.g., figure information 1420) corresponding to the result of analysis on the image (e.g., the new facial area 1400-3a) to the electronic device 1401.

The electronic device 1401 may receive the service information (e.g., the figure information 1420) from the external electronic device 1402 and display the service information on the screen 1460-3 of the application (e.g., Samsung TV™).

In FIG. 14, although in the above description, the external electronic device 1402 obtains the image frame for providing the service information, performs image analysis, or provides the service information corresponding to the result of image analysis, such operations may be performed by the electronic device 1401, without limitations thereto.

FIGS. 15A to 15E are views illustrating an object extraction area in an image frame included in broadcast content by an electronic device according to various embodiments.

Referring to FIGS. 15A to 15E, upon detecting at least one facial area 1510 in at least one image frame 1500 included in broadcast content in response to reception of a request for the broadcast content-related service information, an electronic device (e.g., the electronic device 301) may set an object extraction area (1530 or 1540) for extracting at least one object (e.g., a figure image, product image, text image, or place image) based on the detected facial area 1510.

Figure 15A:
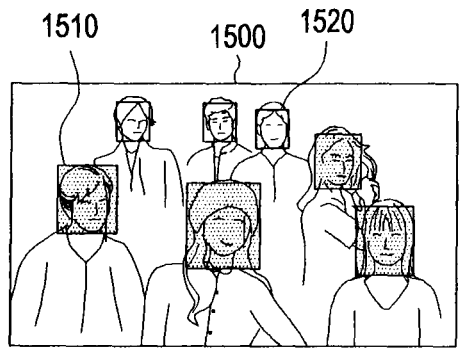
FIGS. 15A to 15E are views illustrating an object extraction area in an image frame included in broadcast content by an electronic device according to various embodiments.

Referring to FIG. 15A, at least one candidate facial area 1510 or 1520 may be recognized in the image frame 1500. Among the at least one recognized candidate facial area 1510 or 1520, one (e.g., 1510) with a size not less than a designated size may be detected as a facial area, and one (e.g., 1520) with a size less than the designated size may not be detected as a facial area.

Referring to FIGS. 15B to 15E, if at least one facial area 1510 is detected in the image frame 1500, an object extraction area 1530 may be set based on the facial area 1510. For example, the electronic device 301 may set the area with a designated size from the detected facial area according to the request as the object extraction area based on the size of the detected facial area 15310, direction of face (e.g., the direction of eye, nose, or mouth) or the position (e.g., the XY coordinates in the image frame 1500) of the detected facial area 1510 in the image frame 1500. The object extraction area 1530 may be set to differ depending on the size of the detected facial area 1510, direction of face, or the position of the detected facial area 1510 in the image frame 1500.

According to an embodiment, if the request includes a request for figure information, the detected facial area 1510 may be set as the object extraction area.

According to an embodiment, if the request includes a request for product information, an area with a designated size from the detected facial area 1510 based on the position of the detected facial area in the image frame 1500, direction of face, or size of the detected facial area 1510 may be set as the object extraction area 1530.

Figure 15B:
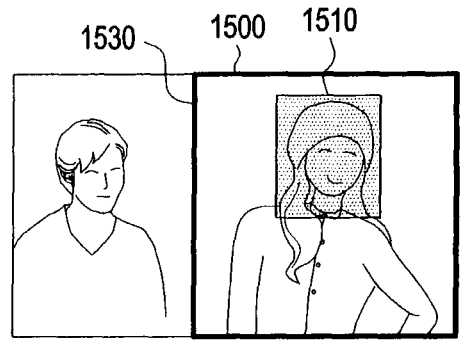

Referring to FIG. 15B, the object extraction area 1530 may be set to have a size of about ½ of the image frame 1500 based on the size of the detected facial area 1510, direction of face, or position.

Figure 15C:
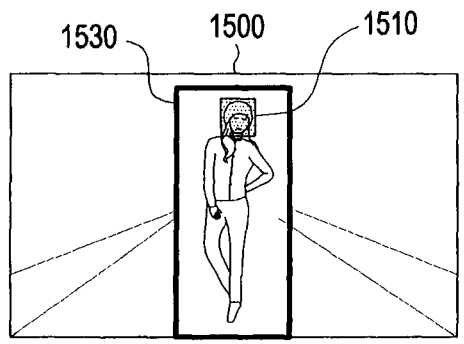

Referring to FIG. 15C, the object extraction area 1530 may be set to have a size of about ⅓ of the image frame 1500, along the vertical direction in the middle of the image frame 1500, based on the size of the detected facial area 1510, direction of face, or position.

Figure 15D:
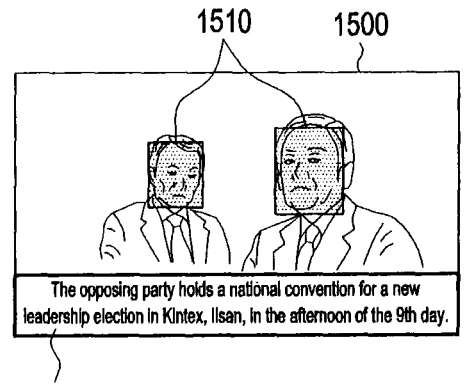

Referring to FIG. 15D, if the request includes a request for text information, and there is the detected facial area 1510, an area with a designated size from the bottom or top of the image frame 1500 may be set as the object extraction area 1530.

Figure 15E:
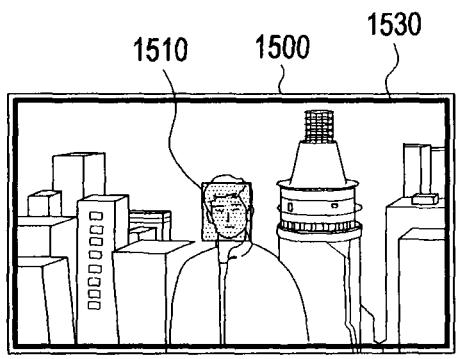

Referring to FIG. 15E, if the request includes a request for place information, and there is the detected facial area 1510, the entire image frame 1500 may be set as the object extraction area 1530.

Figure 16:
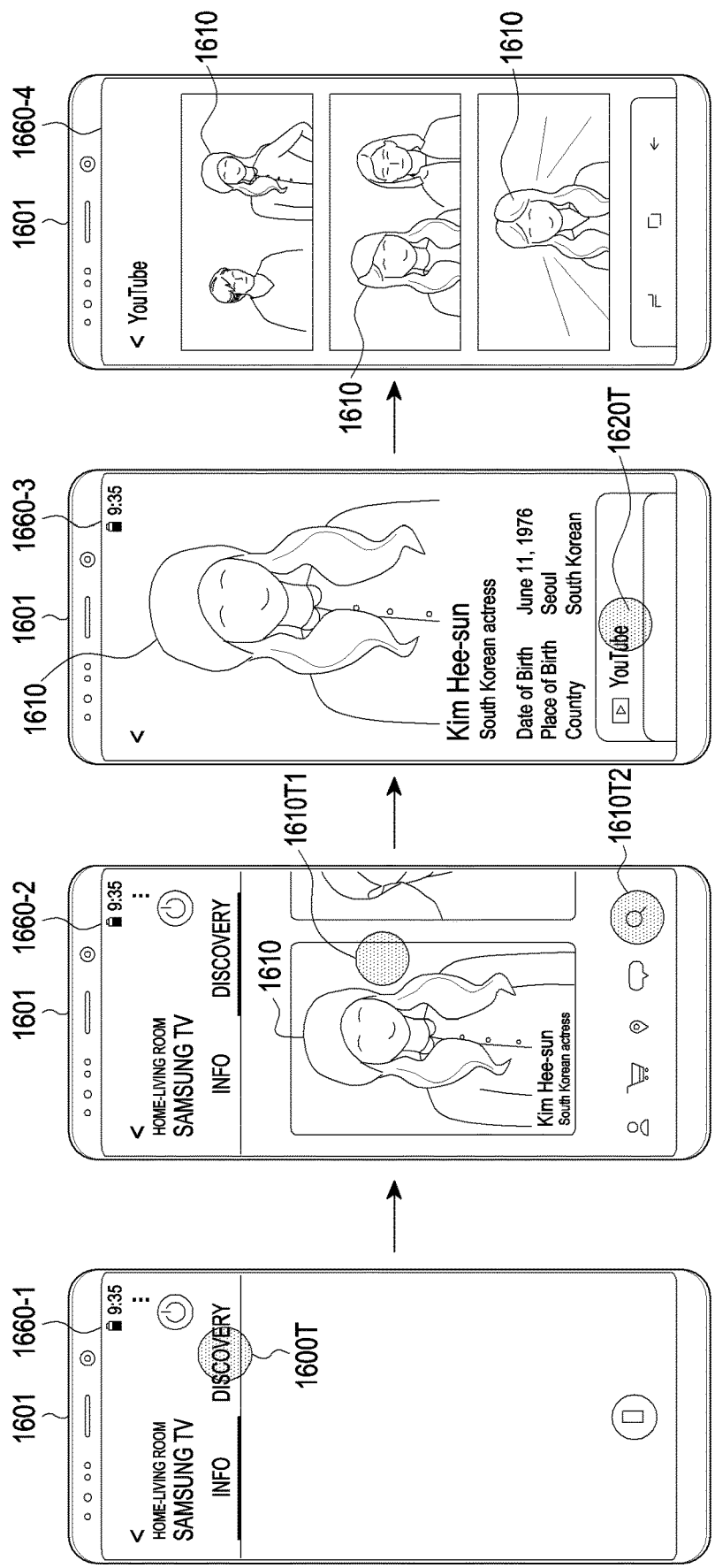
FIG. 16 is a view illustrating a user interface for providing broadcast content-related service information by an electronic device according to various embodiments.

FIG. 16 is a view illustrating a user interface for providing broadcast content-related service information by an electronic device according to various embodiments. Referring to FIG. 16, the electronic device 1601 may include the whole or part of the electronic device 301 shown in FIG. 3.

Referring to FIG. 16, the electronic device 1601 may execute an application (e.g., Samsung TV™) for receiving broadcast content-related service information. Upon touching (1600T) a menu (e.g., "DISCOVERY") for receiving the service information on the screen 1660-1 of the application (e.g., Samsung TV™), the electronic device 1601 may receive first service information from an external electronic device (e.g., the external electronic device 202), a content server (e.g., the content server 208C), a service server (e.g., the service server 208S), or an IoT server (e.g., the IoT server 208N) in response to reception of the touch 1600T.

For example, the electronic device 1601 may display the received first service information (e.g., the figure information 1610) on the screen 1660-2 of the application (e.g., Samsung TV™). To receive detailed information about the first service information (e.g., the figure information 1610) on the screen 1660-2, if the user touches (1610T1) the figure information 1610 displayed on the screen 1660-2 or touches (1620T2) the icon (e.g., a search icon), the electronic device 1601 may receive second service information from the external electronic device 202, content server 208C, service server 208S, or IoT server 208N in response to reception of the touch (1610T1 or 1610T2).

For example, the electronic device 1601 may display the received second service information (e.g., the detailed information about the figure information 1610) on the screen 1660-3 of the application (e.g., Samsung TV™). For example, if, among detailed services for the figure information 1610, a VOD service is provided on the screen 1660-3, a recommendation application (e.g., a VOD play app) (e.g., YouTube™) for providing the VOD service may be displayed. The recommendation application may be a recommendation application personalized based on the user information about the electronic device 301. Upon touching (1620T) the recommendation application for executing the VOD service among the detailed services for the second service information (e.g., the figure information 1610), the electronic device 301 may receive third service information from the external electronic device 202, content server 208C, service server 208S, or IoT server 208N in response to reception of the touch 1620T.

For example, the electronic device 1601 may display the received third service information (e.g., a VOD list among the detailed services for the figure information 1610) on the screen 1600-4 of the application (e.g., Samsung TV™). The third service information (e.g., the VOD list among the detailed services for the figure information 1610) may be listed up based on the user information. For example, the third service information (e.g., the VOD list among the detailed services for the figure information 1610) may be listed up regarding data preferred per age, gender, country, region, address, family, or friend or based on various pieces of data analysis information analyzed per piece of information about the application installed on the electronic device 301, log, use frequency, keyword or web browser use history, view information, or gender/personality/age.

Figure 17:
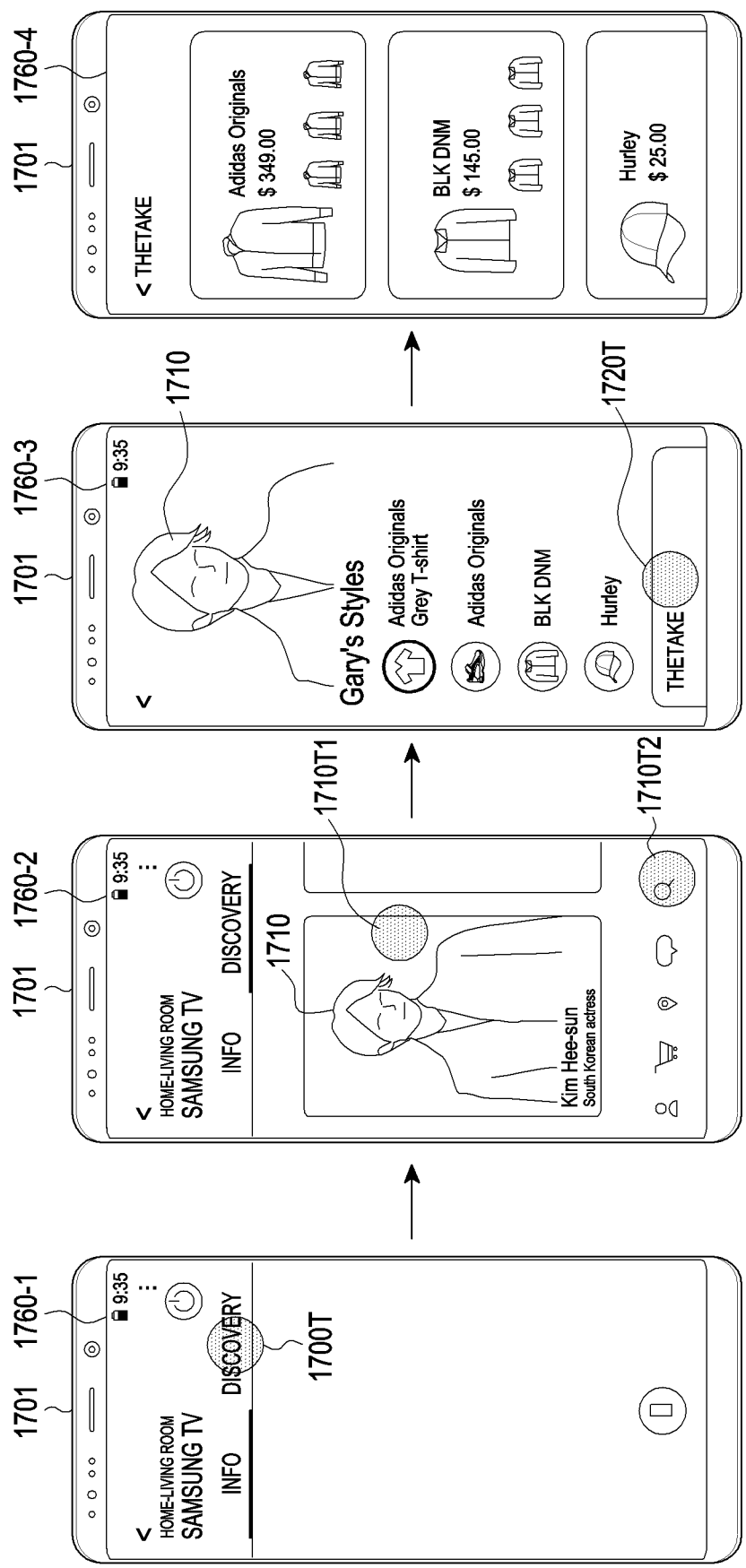
FIG. 17 is a view illustrating a user interface for providing broadcast content-related service information by an electronic device according to various embodiments.

FIG. 17 is a view illustrating a user interface for providing broadcast content-related service information by an electronic device according to various embodiments. Referring to FIG. 17, the electronic device 1701 may include the whole or part of the electronic device 301 shown in FIG. 3.

Referring to FIG. 17, the electronic device 1701 may execute an application (e.g., Samsung TV™) for receiving broadcast content-related service information. Upon touching (1700T) a menu (e.g., "DISCOVERY") for receiving the service information on the screen 1760-1 of the application, the electronic device 1701 may receive first service information from an external electronic device (e.g., the external electronic device 202), a content server (e.g., the content server 208C), a service server (e.g., the service server 208S), or an IoT server (e.g., the IoT server 208N) in response to reception of the touch 1700T.

For example, the electronic device 1701 may display the received first service information (e.g., the figure information 1710) on the screen 1760-2 of the application (e.g., Samsung TV™). To receive product information about the first service information (e.g., the figure information 1710) on the screen 1760-2, if the user touches (1710T1) the product (e.g., clothing) corresponding to the figure information 1710 displayed on the screen 1760-2 or touches (1720T2) the icon (e.g., a search icon), the electronic device 1601 may receive second service information from the external electronic device 202, content server 208C, service server 208S, or IoT server 208N in response to reception of the touch (1710T1 or 1710T2).

For example, the electronic device 1701 may display the received second service information (e.g., the style information related to the figure information 1710) on the screen 1760-3 of the application (e.g., Samsung TV™). For example, if, among detailed services for the figure information 1710, style information is provided on the screen 1760-3, a recommendation application (e.g., a product selling app) for providing the style service may be displayed. The recommendation application may be a recommendation application personalized based on the user information about the electronic device 301. Upon touching (1720T) the recommendation application for executing the clothing selling website among the detailed services for the second service information (e.g., style information related to the figure information 1710), the electronic device 301 may receive third service information from the external electronic device 202, content server 208C, service server 208S, or IoT server 208N in response to reception of the touch 1720T.

For example, the electronic device 1701 may display the received third service information (e.g., item link list of the style information related to the figure information 1710) on the screen 1760-4 of the application (e.g., Samsung TV™). The third service information (e.g., the item link list of the style information related to the figure information 1710) may be listed up based on the user information. For example, the third service information (the item link list of the style information related to the figure information 1710) may be listed up regarding data preferred per age, gender, country, region, address, family, or friend or based on various pieces of data analysis information analyzed per piece of information about the application installed on the electronic device 301, log, use frequency, keyword or web browser use history, view information, or gender/personality/age. The electronic device 301 may access the link website via the third service information (the item link list of the style information related to the figure information 1710) displayed on the screen 1760-4 and perform payment related to the service information via the link website.

Figure 18:
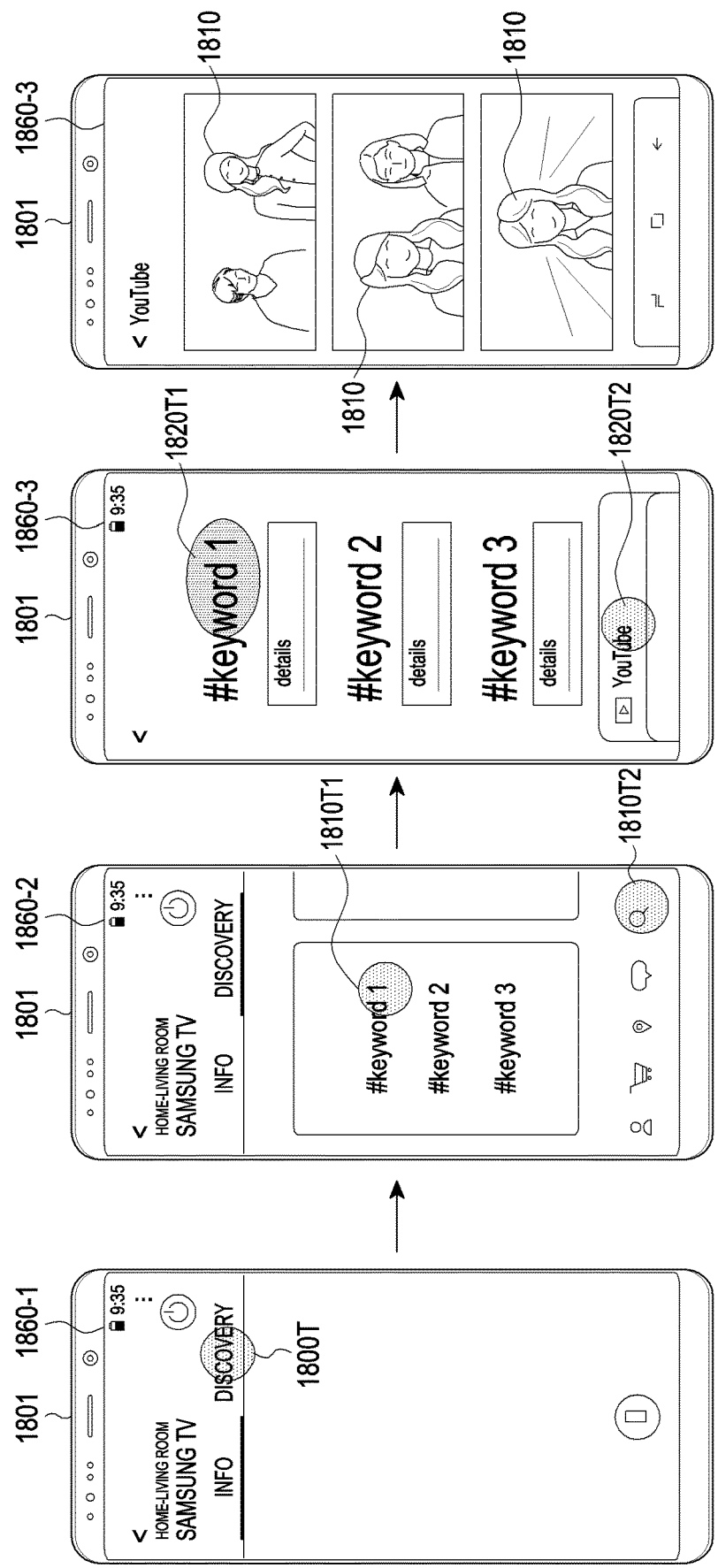
FIG. 18 is a view illustrating a user interface for providing broadcast content-related service information by an electronic device according to various embodiments.

FIG. 18 is a view illustrating a user interface for providing broadcast content-related service information by an electronic device according to various embodiments. Referring to FIG. 18, the electronic device 1801 may include the whole or part of the electronic device 301 shown in FIG. 3.

Referring to FIG. 18, the electronic device 1801 may execute an application (e.g., Samsung TV™) for receiving broadcast content-related service information. Upon touching (1800T) a menu (e.g., "DISCOVERY") for receiving the service information on the screen 1860-1 of the application (e.g., Samsung TV™), the electronic device 1801 may receive first service information from an external electronic device (e.g., the external electronic device 202), a content server (e.g., the content server 208C), a service server (e.g., the service server 208S), or an IoT server (e.g., the IoT server 208N) in response to reception of the touch 1800T.

For example, the electronic device 1801 may display the received first service information (e.g., text information (keyword1, keyword2, keyword3)) on the screen 1860-2 of the application (e.g., Samsung TV™). To receive detailed information about the first service information (e.g., the text information (keyword1, keyword2, keyword3)) on the screen 1860-2, if the user touches (1810T1) the text information (keyword1) displayed on the screen 1860-2 or touches (1820T2) the icon (e.g., a search icon), the electronic device 1801 may receive second service information from the external electronic device 202, content server 208C, service server 208S, or IoT server 208N in response to reception of the touch (1810T1 or 1810T2).

For example, the electronic device 1801 may display the received second service information (e.g., the detailed information (e.g., news or news article) about the text information (keyword1)) on the screen 1860-3 of the application (e.g., Samsung TV™). For example, if, among detailed services for the text information (keyword1), a VOD service is provided on the screen 1860-3, a recommendation application (e.g., a VOD play app) (e.g., YouTube™) for providing the VOD service may be displayed. The recommendation application may be a recommendation application personalized based on the user information about the electronic device 301. Upon touching (1820T) the recommendation application for executing the VOD service among the detailed services for the second service information (e.g., the detailed information (e.g., news or news article) about the text information (keyword1)), the electronic device 301 may receive third service information from the external electronic device 202, content server 208C, service server 208S, or IoT server 208N in response to reception of the touch 1820T.

For example, the electronic device 1801 may display the received third service information (e.g., a VOD list among the detailed services for the text information (keyword1)) on the screen 1860-3 of the application (e.g., Samsung TV™). The third service information (e.g., the VOD list among the detailed services for the text information (keyword1)) may be listed up based on the user information. For example, the third service information (e.g., the VOD list among the detailed services for the text information (keyword1)) may be listed up regarding data preferred per age, gender, country, region, address, family, or friend or based on various pieces of data analysis information analyzed per piece of information about the application installed on the electronic device 301, log, use frequency, keyword or web browser use history, view information, or gender/personality/age.

Figure 19:
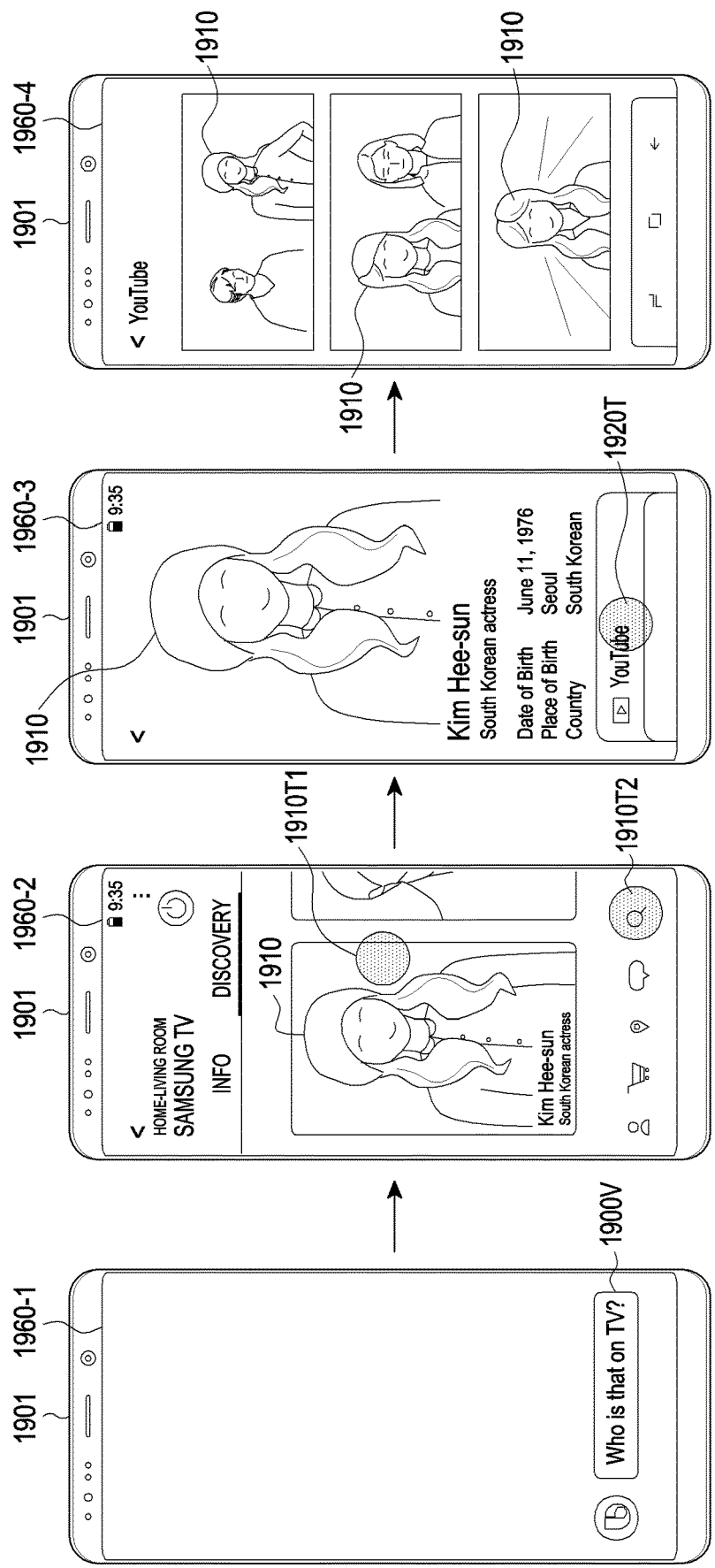
FIG. 19 is a view illustrating a user interface for providing broadcast content-related service information by an electronic device according to various embodiments.

FIG. 19 is a view illustrating a user interface for providing broadcast content-related service information by an electronic device according to various embodiments. In FIG. 19, an electronic device 1901 may include the whole or part of the electronic device 301 of FIG. 3.

Referring to FIG. 19, the electronic device 1901 may execute an application (e.g., Samsung TV™) for receiving broadcast content-related service information. The electronic device 1901 may execute an application (e.g., Samsung's Bixby™) for providing a voice control service and receive a voice (command) 1900V (e.g., Who is that on TV?) uttered from the user. A visual expression (e.g., text, emoticon, image, or dialog window) (e.g., Who is that on TV?) corresponding to the voice (command) 1900V may be displayed on the screen 1960-1 of the application (e.g., Bixby™). On the electronic device 1901, an application (e.g., Samsung TV™) for receiving the broadcast content-related service information via the voice control service app (e.g., Bixby™) may be performed by voice control. Upon receiving the voice (command) 1900V for executing the application (e.g., Samsung TV™) for receiving the broadcast content-related service information, the electronic device 1901 may receive first service information from an external electronic device (e.g., the external electronic device 202, a content server (e.g., the content server 208C), a service server (e.g., the service server 208S), or an IoT server (e.g., the IoT server 208N)) in response to reception of the voice (command) 1900V.

For example, the electronic device 1601 may display the received first service information (e.g., the figure information 1910) on the screen 1960-2 of the application (e.g., Samsung TV™). To receive detailed information about the first service information (e.g., the figure information 1910) on the screen 1960-2, if the user touches (1910T1) the figure information 1910 displayed on the screen 1960-2 or touches (1920T2) the icon (e.g., a search icon), the electronic device 1601 may receive second service information from the external electronic device 202, content server 208C, service server 208S, or IoT server 208N in response to reception of the touch (1910T1 or 1910T2).

For example, the electronic device 1901 may display the received second service information (e.g., the detailed information about the figure information 1910) on the screen 1960-3 of the application (e.g., Samsung TV™). For example, if, among detailed services for the figure information 1910, a VOD service is provided on the screen 1960-3, a recommendation application (e.g., a VOD play app) (e.g., YouTube™) for providing the VOD service may be displayed. The recommendation application may be a recommendation application personalized based on the user information about the electronic device 301. Upon touching (1920T) the recommendation application for executing the VOD service among the detailed services for the second service information (e.g., the figure information 1910), the electronic device 301 may receive third service information from the external electronic device 202, content server 208C, service server 208S, or IoT server 208N in response to reception of the touch 1920T.

For example, the electronic device 1901 may display the received third service information (e.g., a VOD list among the detailed services for the figure information 1910) on the screen 1960-4 of the application (e.g., Samsung TV™). The third service information (e.g., the VOD list among the detailed services for the figure information 1910) may be listed up based on the user information. For example, the third service information (e.g., the VOD list among the detailed services for the figure information 1910) may be listed up regarding data preferred per age, gender, country, region, address, family, or friend or based on various pieces of data analysis information analyzed per piece of information about the application installed on the electronic device 301, log, use frequency, keyword or web browser use history, view information, or gender/personality/age.

Figure 20:
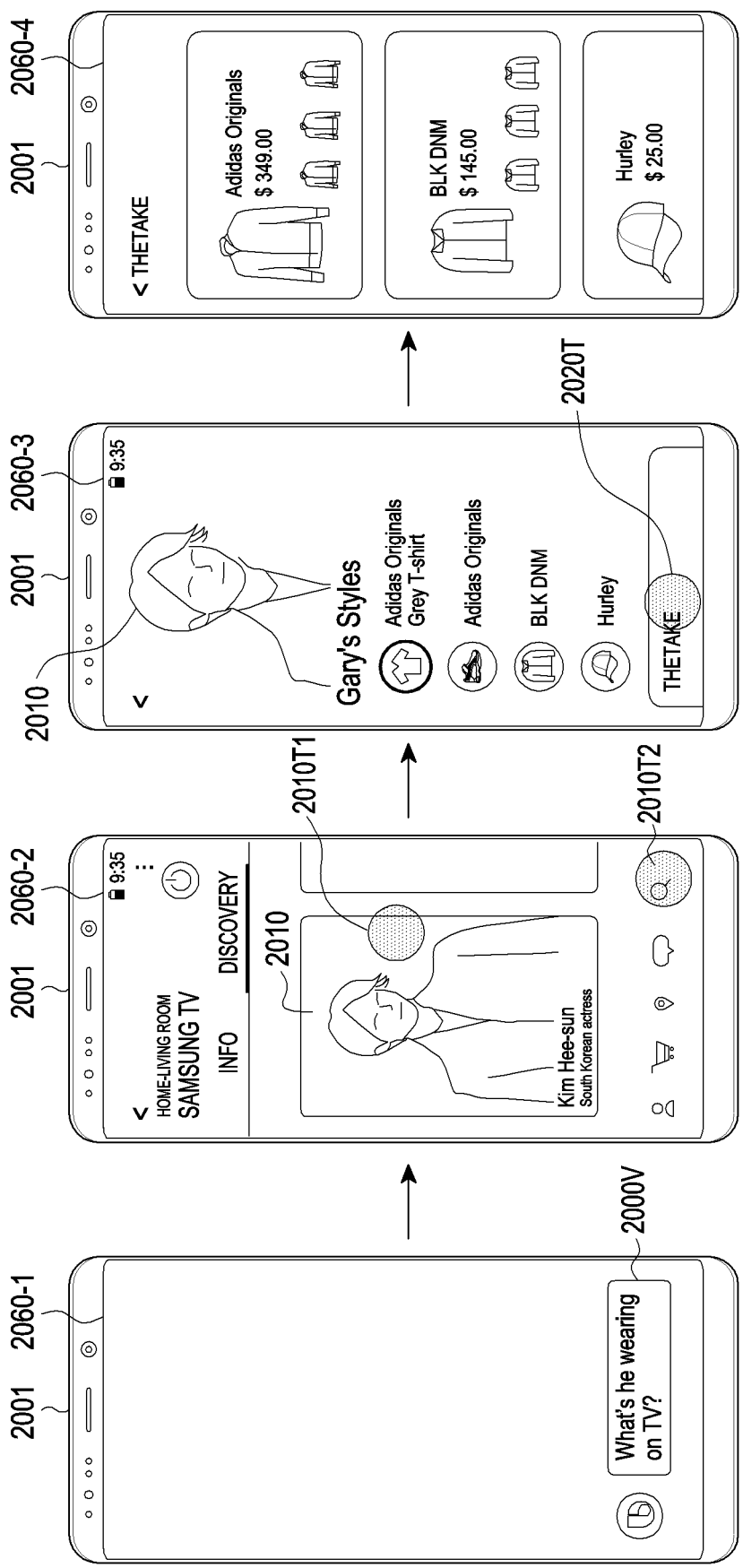
FIG. 20 is a view illustrating a user interface for providing broadcast content-related service information by an electronic device according to various embodiments.

FIG. 20 is a view illustrating a user interface for providing broadcast content-related service information by an electronic device according to various embodiments. In FIG. 20, an electronic device 2001 may include the whole or part of the electronic device 301 of FIG. 3.

Referring to FIG. 20, the electronic device 2001 may execute an application (e.g., Samsung TV™) for receiving broadcast content-related service information. The electronic device 2001 may execute an application (e.g., Samsung's Bixby™) for providing a voice control service and receive a voice (command) 2000V (e.g., What's he wearing on TV?) uttered from the user. A visual expression (e.g., text, emoticon, image, or dialog window) (e.g., What's he wearing on TV?) corresponding to the voice (command) 2000V may be displayed on the screen 2060-1 of the application (e.g., Bixby™). On the electronic device 2001, an application (e.g., Samsung TV™) for receiving the broadcast content-related service information via the voice control service app (e.g., Bixby™) may be performed by voice control. Upon receiving the voice (command) 2000V for executing the application (e.g., Samsung TV™) for receiving the broadcast content-related service information, the electronic device 2001 may receive first service information from an external electronic device (e.g., the external electronic device 202, a content server (e.g., the content server 208C), a service server (e.g., the service server 208S), or an IoT server (e.g., the IoT server 208N)) in response to reception of the voice (command) 2000V.

For example, the electronic device 2001 may display the received first service information (e.g., the figure information 2010) on the screen 2060-2 of the application (e.g., Samsung TV™). To receive product information about the first service information (e.g., the figure information 2005) on the screen 2060-2, if the user touches (2010T1) the product (e.g., clothing) corresponding to the figure information 2010 displayed on the screen 2060-2 or touches (2010T2) the icon (e.g., a search icon), the electronic device 1601 may receive second service information from the external electronic device 202, content server 208C, service server 208S, or IoT server 208N in response to reception of the touch (2010T1 or 2010T2).

For example, the electronic device 2001 may display the received second service information (e.g., the style information related to the figure information 2005) on the screen 2060-3 of the application (e.g., Samsung TV™). If, among detailed services for the figure information 2005, style information is provided on the screen 2060-3, a recommendation application (e.g., a product selling app) for providing the style service may be displayed. The recommendation application may be a recommendation application personalized based on the user information about the electronic device 301. Upon touching (2020T) the recommendation application for executing the clothing selling website among the detailed services for the second service information (e.g., style information related to the figure information 2010), the electronic device 301 may receive third service information from the external electronic device 202, content server 208C, service server 208S, or IoT server 208N in response to reception of the touch 2020T.

For example, the electronic device 2001 may display the received third service information (e.g., item link list of the style information related to the figure information 2010) on the screen 2060-4 of the application (e.g., Samsung TV™). The third service information (e.g., the item link list of the style information related to the figure information 2010) may be listed up based on the user information. For example, the third service information (e.g., the item link list of the style information related to the figure information 2010) may be listed up regarding data preferred per age, gender, country, region, address, family, or friend or based on various pieces of data analysis information analyzed per piece of information about the application installed on the electronic device 301, log, use frequency, keyword or web browser use history, view information, or gender/personality/age. The electronic device 301 may access the link website via the third service information (the item link list of the style information related to the figure information 2010) displayed on the screen 2060-4 and perform payment related to the service information via the link website.

Figure 21:
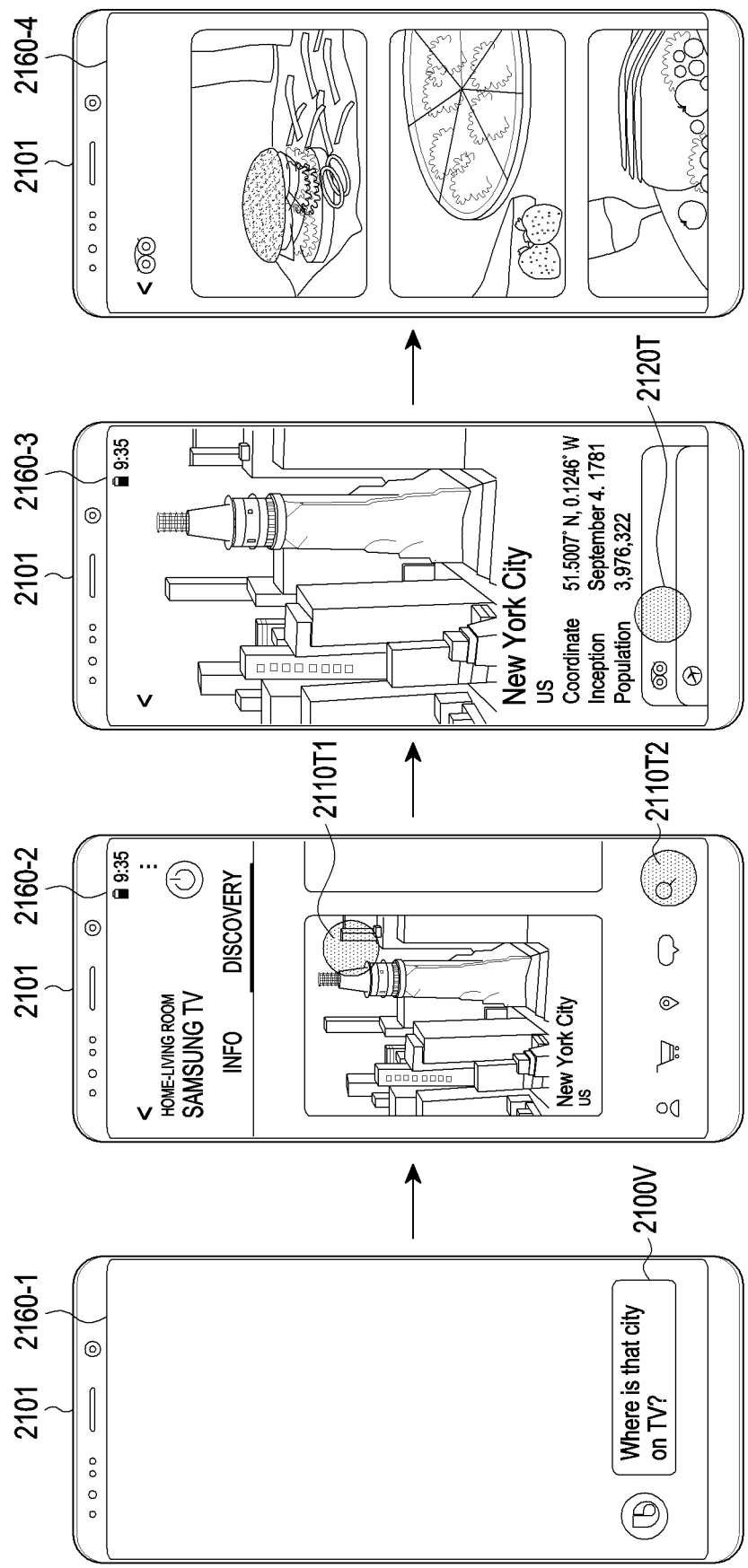
FIG. 21 is a view illustrating a user interface for providing broadcast content-related service information by an electronic device according to various embodiments.

FIG. 21 is a view illustrating a user interface for providing broadcast content-related service information by an electronic device according to various embodiments. In FIG. 21, an electronic device 2101 may include the whole or part of the electronic device 301 of FIG. 3.

Referring to FIG. 21, the electronic device 2101 may execute an application (e.g., Samsung TV™) for receiving broadcast content-related service information. The electronic device 2101 may execute an application (e.g., Samsung's Bixby™) for providing a voice control service and receive a voice (command) 2100V (e.g., Where is that city?) uttered from the user. A visual expression (e.g., text, emoticon, image, or dialog window) (e.g., Where is that city?) corresponding to the voice (command) 2100V may be displayed on the screen 2160-1 of the application (e.g., Bixby™). On the electronic device 2101, an application (e.g., Samsung TV™) for receiving the broadcast content-related service information via the voice control service app (e.g., Bixby™) may be performed by voice control. Upon receiving the voice (command) 2100V for executing the application (e.g., Samsung TV™) for receiving the broadcast content-related service information, the electronic device 2101 may receive first service information from an external electronic device (e.g., the external electronic device 202, a content server (e.g., the content server 208C), a service server (e.g., the service server 208S), or an IoT server (e.g., the IoT server 208N)) in response to reception of the voice (command) 2100V.

For example, the electronic device 2101 may display the received first service information (e.g., the place information 2110) on the screen 2160-2 of the application (e.g., Samsung TV™). To receive detailed information about the first service information (e.g., the place information 2110) on the screen 2160-2, if the user touches (2110T1) the place information 2110 displayed on the screen 2160-2 or touches (2110T2) the icon (e.g., a search icon), the electronic device 1601 may receive second service information from the external electronic device 202, content server 208C, service server 208S, or IoT server 208N in response to reception of the touch (2110T1 or 2110T2).

For example, the electronic device 2101 may display the received second service information (e.g., the detailed information related to the place information 2110) on the screen 2160-3 of the application (e.g., Samsung TV™). For example, if, among detailed services for the place information 2110, ambient restaurant information is provided on the screen 2160-3, a recommendation application (e.g., a restaurant website) for providing the restaurant information may be displayed. The recommendation application may be a recommendation application personalized based on the user information about the electronic device 301. Upon touching (2120T) the recommendation application for executing the restaurant website among the detailed services for the second service information (e.g., detailed information related to the place information 2110), the electronic device 301 may receive third service information from the external electronic device 202, content server 208C, service server 208S, or IoT server 208N in response to reception of the touch 2120T.

For example, the electronic device 2101 may display the received third service information (e.g., the ambient restaurant list of the detailed information of the place information 2110) on the screen 2160-4 of the application (e.g., Samsung TV™). The third service information (e.g., the ambient restaurant list of the detailed information of the place information 2110) may be listed up based on the user information. For example, the third service information (e.g., the ambient restaurant list of the detailed information of the place information 2110) may be listed up regarding data preferred per age, gender, country, region, address, family, or friend or based on various pieces of data analysis information analyzed per piece of information about the application installed on the electronic device 301, log, use frequency, keyword or web browser use history, view information, or gender/personality/age.

According to various embodiments of the present invention, only when at least one facial area is detected from at least one image frame included in the broadcast content, the electronic device may perform accurate image analysis on the image frame using an image recognition technique or image recognition algorithm further advanced than face recognition, based on the detected facial area, thereby reducing resources necessary to provide the broadcast content-related service information and hence providing efficient service information.

According to various embodiments of the present invention, the electronic device may automatically provide the broadcast content-related service information, without the user's involvement, based on a variation in the number of facial areas in at least one image frame included in the broadcast content.

According to various embodiments of the present invention, the electronic device may provide the broadcast content-related service information based on the results of image analysis on all the objects (e.g., figure images, product images, text images, or place images) in the image frame based on the facial area of the at least one image frame included in the broadcast content.

The embodiments disclosed herein are proposed for description and understanding of the disclosed technology and does not limit the scope of the present invention. Accordingly, the scope of the present invention should be interpreted as including all changes or various embodiments based on the technical spirit of the present invention.

What is claimed is:

1. An electronic device, comprising:
at least one communication interface;
a display;
a memory; and
at least one processor electrically connected with the at least one communication interface, the display, and the memory, wherein
the memory stores instructions that cause, when executed, the at least one processor to:
in response to reception of a request for service information related to broadcast content transmitted from a content server, obtain at least one image frame included in the broadcast content,
determine whether at least one facial area is detected from the at least one image frame,
upon determining that the at least one facial area is detected, set a first object extraction area based on the detected at least one facial area in an image frame from which the at least one facial area is detected from among the at least one image frame, detect at least one first object by performing image analysis on the set first object extraction area, extract first object information from the detected at least one first object, extract meta information related to the broadcast content from the broadcast content, determine whether there is meta information matching the first object information at least partially based on the meta information, and upon determining that there is the meta information matching the first object information, provide the meta information matching the first object information as first service information via the display.

2. The electronic device of claim 1, wherein the memory stores instructions that cause, when executed, the at least one processor to:

upon determining that there is no meta information matching the first object information, transmit a request for the first service information corresponding to the first object or the first object information, including the first object or the first object information, to a service server via the at least one communication interface, and in response to the transmission of the request, receive the first service information corresponding to the first object or the first object information or receive first similar service information corresponding to the first object or the first object information from the service server.

3. The electronic device of claim 1, wherein the memory stores instructions that cause, when executed, the at least one processor to:

upon determining that the at least one facial area is detected, determine whether a number of the detected at least one facial area in the at least one image frame is varied, upon determining that the number of the detected at least one facial area in the at least one image frame is varied, determine whether a new facial area is detected, upon determining that the new facial area is detected, perform image analysis based on the detected new facial area, and provide service information corresponding to a result of the image analysis via the display.

4. The electronic device of claim 3, wherein the memory stores instructions that cause, when executed, the at least one processor to:

set second object extraction area based on the detected new facial area in an image frame from which the new facial area is detected, detect at least one second object by performing image analysis on the set second object extraction area, extract second object information from the detected at least one second object, determine whether there is meta information matching the second object information at least partially based on the meta information, and upon determining that there is the meta information matching the second object information, provide the meta information matching the second object information as second service information.

5. The electronic device of claim 4, wherein the memory stores instructions that cause, when executed, the at least one processor to:

upon determining that there is no meta information matching the second object information, transmit a request for the second service information corresponding to the second object or the second object information, including the second object or the second object information, to a service server via the at least one communication interface, and in response to the transmission of the request, receive the second service information corresponding to the second object or the second object information or receive second similar service information corresponding to the second object or the second object information from the service server.

6. The electronic device of claim 5, wherein the first object or the second object includes a face image, a product image, a text image, or a place image corresponding to each detected facial area, wherein the first service information or the second service information includes figure information, product information, text information, or place information corresponding to the each detected facial area, and wherein first similar service information corresponding to the first object or the first object information or the second similar service information includes similar figure information, similar product information, similar text information, or similar place information corresponding to the each detected facial area.

7. The electronic device of claim 1, wherein the memory stores instructions that cause, when executed, the at least one processor to:

identify user information of the electronic device, select at least one recommendation service information category corresponding to the service information at least partially based on the user information, and display, on the display, a recommendation application corresponding to the selected at least one recommendation service information category at least partially based on the user information.

8. A non-transitory computer-readable recording medium recording a program running on a computer, the program comprising executable instructions that cause, when executed by a processor, the processor to:

by an electronic device, in response to reception of a request for service information related to broadcast content transmitted from a content server, obtain at least one image frame included in the broadcast content;

determine whether at least one facial area is detected from the at least one image frame;

upon determining that the at least one facial area is detected, set a first object extraction area based on the detected at least one facial area in an image frame from which the at least one facial area is detected from among the at least one image frame;

detect at least one first object by performing image analysis on the set first object extraction area;

extract first object information from the detected at least one first object;

extract meta information related to the broadcast content from the broadcast content;

determine whether there is meta information matching the first object information at least partially based on the meta information; and upon determining that there is the meta information matching the first object information, provide the meta information matching the first object information as first service information via a display of the electronic device.

9. The non-transitory computer-readable recording medium of claim 8, wherein the program comprises executable instructions that cause, when executed by a processor, the processor to:
- upon determining that there is no meta information matching the first object information, transmit a request for the first service information corresponding to the first object or the first object information, including the first object or the first object information, to a service server via at least one communication interface and
- in response to the transmission of the request, receive the first service information corresponding to the first object or the first object information or receive first similar service information corresponding to the first object or the first object information from the service server.

10. The non-transitory computer-readable recording medium of claim 8, wherein the program comprises executable instructions that cause, when executed by a processor, the processor to:
- upon determining that the at least one facial area is detected, determine whether a number of the detected at least one facial area in the at least one image frame is varied,
- upon determining that the number of the detected at least one facial area in the at least one image frame is varied, determine whether a new facial area is detected,
- upon determining that the new facial area is detected, perform image analysis based on the detected new facial area, and
- provide service information corresponding to a result of the image analysis via the display.

11. The non-transitory computer-readable recording medium of claim 10, wherein the program comprises executable instructions that cause, when executed by a processor, the processor to:
- set second object extraction area based on the detected new facial area in a second image frame from which the new facial area is detected,
- detect at least one second object by performing image analysis on the set second object extraction area,
- extract second object information from the detected at least one second object,
- determine whether there is meta information matching the second object information at least partially based on the meta information, and
- upon determining that there is the meta information matching the second object information, provide the meta information matching the second object information as second service information.

12. The non-transitory computer-readable recording medium of claim 11, wherein the program comprises executable instructions that cause, when executed by a processor, the processor to:
- upon determining that there is no meta information matching the second object information, transmit a request for the second service information corresponding to the second object or the second object information, including the second object or the second object information, to a service server via at least one communication interface and
- in response to the transmission of the request, receive the second service information corresponding to the second object or the second object information or receive second similar service information corresponding to the second object or the second object information from the service server.

* * * * *